United States Patent
Sim

(10) Patent No.: US 9,347,683 B2
(45) Date of Patent: May 24, 2016

(54) HOT WATER SUPPLY APPARATUS ASSOCIATED WITH HEAT PUMP

(71) Applicant: LG ELECTRONICS INC., Seoul (KR)

(72) Inventor: Jieseop Sim, Changwon-si Gyeongnam (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/329,133

(22) Filed: Jul. 11, 2014

(65) Prior Publication Data

US 2014/0326011 A1    Nov. 6, 2014

Related U.S. Application Data

(62) Division of application No. 13/077,022, filed on Mar. 31, 2011.

(30) Foreign Application Priority Data

May 20, 2010    (KR) .................. 10-2010-0047300

(51) Int. Cl.
F25B 7/00 (2006.01)
F24H 4/02 (2006.01)
F24D 11/02 (2006.01)
F24D 17/02 (2006.01)

(52) U.S. Cl.
CPC ............. *F24H 4/02* (2013.01); *F24D 11/0214* (2013.01); *F24D 17/02* (2013.01); *Y02B 30/126* (2013.01)

(58) Field of Classification Search
CPC ............. F25B 30/02; F25B 13/00; F25B 7/00
See application file for complete search history.

(56) References Cited

U.S. PATENT DOCUMENTS

| | | | |
|---|---|---|---|
| 4,893,476 A | 1/1990 | Bos et al. | 62/79 |
| 5,184,472 A | 2/1993 | Guilbault et al. | 62/120 |
| 5,241,829 A | 9/1993 | Irie et al. | 62/79 |
| 5,388,420 A * | 2/1995 | Yoshida | F25B 7/00 165/902 |
| 6,298,683 B1 | 10/2001 | Kondo et al. | 62/335 |
| 6,379,318 B1 * | 4/2002 | Nishimura | G01N 33/723 600/573 |
| 2001/0023594 A1 | 9/2001 | Ives | 62/335 |
| 2005/0189431 A1 | 9/2005 | Nakayama et al. | 237/12 |

FOREIGN PATENT DOCUMENTS

| | | |
|---|---|---|
| CN | 1969154 A | 5/2007 |
| EP | 1 780 476 A1 | 5/2007 |
| JP | 02-195162 | 8/1990 |

(Continued)

OTHER PUBLICATIONS

Tomohiro et al., Refrigerating Machine, Nov. 24, 2000, JP2000320914A, Whole Document.*

(Continued)

*Primary Examiner* — M. Alexandra Elve
*Assistant Examiner* — Larry Furdge
(74) *Attorney, Agent, or Firm* — KED & Associates LLP

(57) ABSTRACT

A hot water supply apparatus associated with a heat pump is provided. The hot water supply apparatus performs a hot water supply operation using a high temperature refrigerant that has been discharged from a compressor, and simultaneously performs an indoor heating operation using a two-stage refrigerant cycle. This allows the apparatus to supply hot water while simultaneously providing heating/cooling to an indoor space.

13 Claims, 11 Drawing Sheets

(56) References Cited

FOREIGN PATENT DOCUMENTS

| | | | |
|---|---|---|---|
| JP | 04-263758 | | 9/1992 |
| JP | H10-38422 A | | 2/1998 |
| JP | 2000320914 A | * | 11/2000 |
| JP | 2002286286 A | * | 10/2002 |
| JP | 2004-132647 | | 4/2004 |
| JP | 2005-299935 | | 10/2005 |
| JP | 2006-090574 | | 4/2006 |
| JP | 2007-205595 | | 8/2007 |
| JP | 2008-051464 | | 3/2008 |
| KR | 10-1986-0005195 | | 7/1987 |
| KR | 10-2003-0071607 A | | 9/2003 |
| KR | 10-0639104 | | 10/2006 |
| WO | WO 2008/150289 A1 | | 12/2008 |

OTHER PUBLICATIONS

Tomohisa et al., Hybrid Type Hot-Water, Supplier and Method of Hybrid Hot-Water Supplying, Oct. 3, 2002, JP2002286286A, Whole Document.*

U.S. Office Action issued in co-pending U.S. Appl. No. 13/077,022 dated Nov. 19, 2014.

U.S. Office Action for parent U.S. Appl. No. 13/077,022 dated Apr. 9, 2015.

International Search Report issued in PCT Application No. PCT/KR2010/006617 dated Jun. 9, 2011.

Korean Office Action issued in KR Application No. 10-2010-0047300 dated Feb. 24, 2012.

European Search Report issued in EP Application No. 11 158 594.9 dated Jan. 30, 2014.

U.S. Office Action issued in co-pending U.S. Appl. No. 13/077,022 dated May 23, 2014.

Chinese Patent Certificate for CN 102252445 B issued in related Application No. 201110064698 dated Dec. 25, 2013.

U.S. Final Office Action issued in co-pending U.S. Appl. No. 13/077,022 dated Oct. 15, 2015.

Yuichi, Air Conditioner, Feb. 13, 1998, JPH1038422A, Whole Document.

* cited by examiner

HOT WATER SUPPLY APPARATUS ASSOCIATED WITH HEAT PUMP

CROSS-REFERENCE TO RELATED APPLICATION(S)

This application is a Divisional application of prior U.S. patent application Ser. No. 13/077,022 filed Mar. 31, 2011, which claims priority under 35 U.S.C. §119 to Korean Application No. 10-2010-0047300 filed in Korea on May 20, 2010, whose entire disclosure is hereby incorporated by reference.

BACKGROUND

1. Field

This relates to a hot water supply apparatus associated with a heat pump.

2. Background

In general, a hot water supply apparatus uses a heating source to heat water and supply the heated water to a user. Such a hot water supply apparatus may include a water supply passage for supplying water, a water storage device for storing the water supplied through the water supply passage, a heating source for heating the supplied water, and a water discharge passage for supplying the heated water to a user.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to various embodiments, examples of which are illustrated in the accompanying drawings.

A heat pump may include a compressor, a condenser in which refrigerant discharged from the compressor is condensed, an expander in which refrigerant from the condenser is expanded, an evaporator in which refrigerant from the expander is evaporated, and a refrigerant pipe connecting the compressor, the condenser, the expander, and the evaporator to form a refrigerant cycle. While the refrigerant flows in the heat pump, the refrigerant absorbs heat in the evaporator and emits heat in the condenser. The refrigerant may transmit heat to the water in a hot water supply apparatus associated with the heat pump, so that the hot water supply apparatus can perform a hot water supply operation.

Figure 1:
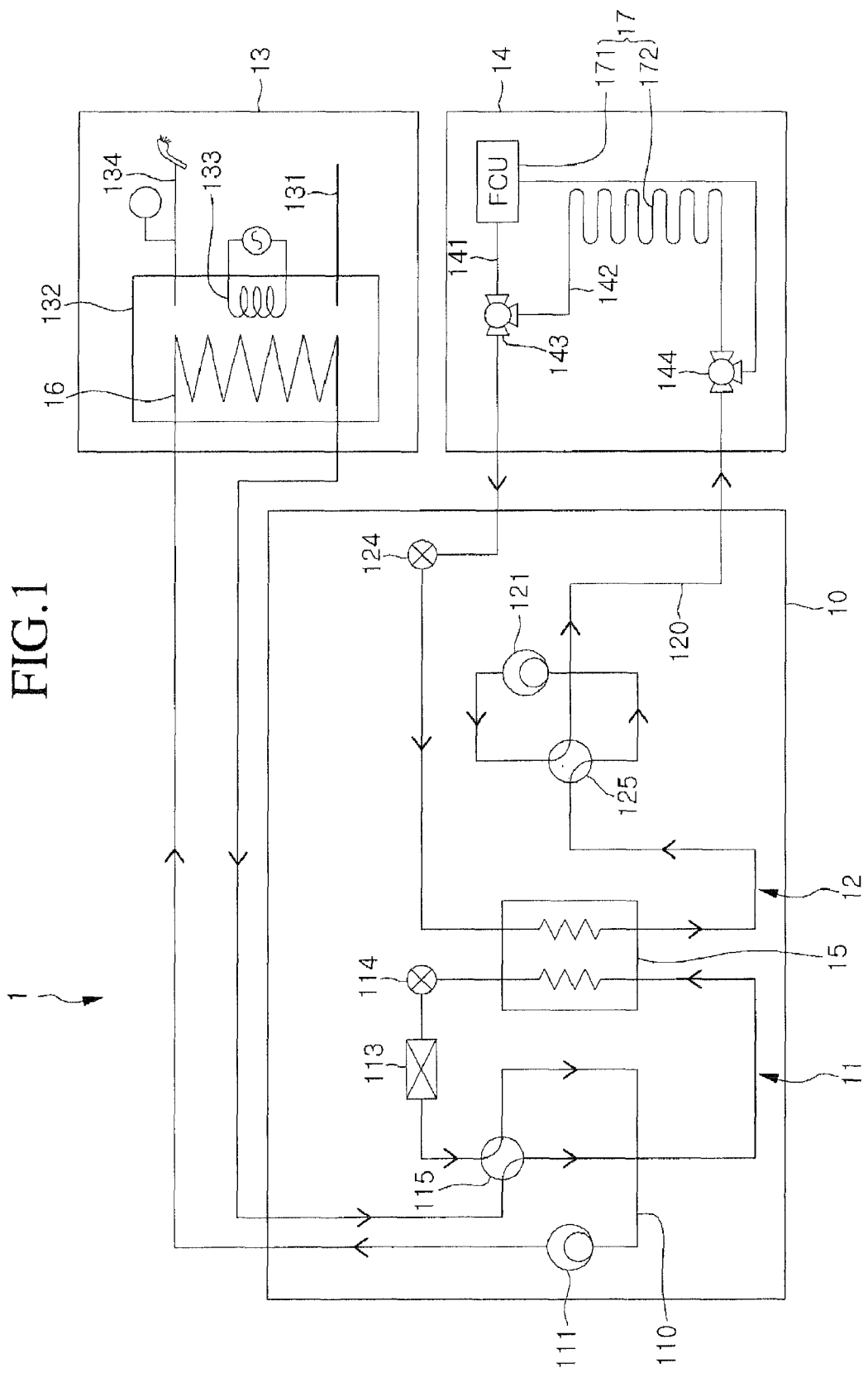
FIG. 1 is a schematic view of a hot water supply apparatus associated with a heat pump according to an embodiment as broadly described herein.

As shown in FIG. 1, a hot water supply apparatus associated with a heat pump according to an embodiment as broadly described herein may include a heat pump 10 including a first refrigerant circulation part 11 in which a first refrigerant cycle using a first refrigerant is performed, a second refrigerant circulation part 12 in which a second refrigerant cycle using a second refrigerant is performed, a hot water supply device 13 which supplies hot water using the first refrigerant, and a heating device 14 which heats an indoor space using the second refrigerant.

The first refrigerant circulation part 11 may include a first compressor 111 that compresses the first refrigerant, a first hot water supply heat exchanger 16 in which the first refrigerant discharged from the first compressor 111 flows to heat water supplied for supplying hot water, a cascade heat exchanger 15 that performs heat exchange between the first refrigerant and the second refrigerant, an outdoor heat exchanger 113 that performs heat exchange between the first refrigerant and outdoor air, a first expander 114 disposed between the cascade heat exchanger 15 and the outdoor heat exchanger 113 in the first refrigerant cycle to expand the first refrigerant, a first flow switch 115 that selectively switches a flow direction of the first refrigerant passing through the hot water supply heat exchanger 16 into one of the cascade heat exchanger 15 or the outdoor heat exchanger 113, and a first refrigerant pipe 110 connecting the first compressor 111, the hot water supply heat exchanger 16, the cascade heat exchanger 15, the first expander 114, the outdoor heat exchanger 113, and the first flow switch 115 to each other to form the first refrigerant cycle.

Since the hot water supply heat exchanger 16 is disposed between the first compressor 111 and the first flow switch 115 in the first refrigerant cycle, the high-temperature refrigerant discharged from the first compressor 111 may flow into the hot water supply heat exchanger 16, regardless of a switch state of the first flow switch 115. Also, the hot water supply heat exchanger 16 may form a first refrigerant passage which is disposed in a water supply storage device 132 of the hot water supply device 13 to heat the water to be supplied using the first refrigerant.

However, since the cascade heat exchanger 15 and the outdoor heat exchanger 113 are disposed downstream of the first flow switch 115 with respect to a flow direction of the first refrigerant in the first refrigerant cycle, the first refrigerant having a different state may flow into the cascade heat exchanger 15 and the outdoor heat exchanger 113 depending on the switch state of the first flow switch 115.

In detail, when the hot water supply apparatus 1 is operated in a heating mode, the first flow switch 115 is positioned so that the first refrigerant passing through the hot water supply heat exchanger 16 is introduced into the cascade heat exchanger 15. Thus, the heat of the first refrigerant is transferred into the second refrigerant while the first refrigerant passes through the cascade heat exchanger 15, and thus the first refrigerant is condensed. Also, the first refrigerant receives heat from the outdoor air while passing through the outdoor heat exchanger 113, and thus the first refrigerant is evaporated.

When the hot water supply apparatus 1 is operated in cooling mode, the first flow switch 115 is positioned so that the first refrigerant passing through the hot water supply heat exchanger 16 is introduced into the outdoor heat exchanger 113. Thus, the first refrigerant is condensed while passing through the outdoor heat exchanger 113 and is evaporated while passing through the cascade heat exchanger 15.

If the hot water supply apparatus 1 associated with the heat pump is operated in the heating mode, the first refrigerant circulation part 11 may include the first compressor 111 compressing the first refrigerant, a plurality of condensers 15 and 16 in which the first refrigerant discharged from the first compressor 111 is condensed, the first expander 114 in which the first refrigerant passing through the plurality of condensers 15 and 16 is expanded, and a first evaporator 113 in which the first refrigerant passing through the first expander 114 is evaporated. The plurality of condensers 15 and 16 may include a hot water supply condenser 16 for supplying hot water using the high-temperature refrigerant discharged from the first compressor 111 and a cascade condenser 15 exchanging heat between the first refrigerant and the second refrigerant. The hot water supply condenser 16 may be referred to as a primary condenser 16 in that the high-temperature refrigerant discharged from the first compressor 111 undergoes primary condensation therein, and the cascade condenser 15 may be referred to as a secondary condenser 15 in that the first refrigerant undergoes secondary condensation therein.

In this instance, the hot water supply condenser 16 may correspond to the hot water supply heat exchanger 16. Also, the cascade condenser 15 may correspond to the cascade heat exchanger 15, and the first evaporator 113 may correspond to the outdoor heat exchanger 113.

The second refrigerant circulation part 12 may include a second compressor 121 that compresses the second refrigerant, an indoor heat exchanger 17 that performs heat exchange between indoor air and the second refrigerant, the cascade heat exchanger 15 that performs heat exchange between the first refrigerant and the second refrigerant, a second expander 124 disposed between the indoor heat exchanger 17 and the cascade heat exchanger 15 to expand the second refrigerant, a second flow switch 125 that selectively switches a flow direction of the second refrigerant passing through the second compressor 121 toward one of the indoor heat exchanger 17 or the cascade heat exchanger 15, and a second refrigerant pipe 120 connecting the second compressor 121, the indoor heat exchanger 17, the cascade heat exchanger 15, the second expander 124, and the second flow switch 125 to each other to form the second refrigerant cycle. The indoor heat exchanger 17 forms a second refrigerant passage disposed adjacent to the indoor space to exchange heat between the indoor air and the second refrigerant.

Since the indoor exchanger 17 and the cascade heat exchanger 15 are disposed downstream of the second flow switch 125 with respect to a flow direction of the second refrigerant in the second refrigerant cycle, the second refrigerant having a different state may flow into the indoor exchanger 17 and the cascade heat exchanger 15 depending on the switch state of the second flow switch 125.

In more detail, when the hot water supply apparatus 1 is operated in the heating mode, the second flow switch 125 is positioned so that the second refrigerant passing through the second compressor 121 is introduced into the indoor heat exchanger 17. Thus, the heat of the second refrigerant is released into the indoor space while the second refrigerant passes through the indoor heat exchanger 17. Also, the second refrigerant is heated by the first refrigerant while passing through the cascade heat exchanger 15, and thus the second refrigerant is evaporated.

When the hot water supply apparatus 1 is operated in the cooling mode, the second flow switch 125 is positioned so that the second refrigerant passing through the second compressor 121 is introduced into the cascade heat exchanger 15. The heat of the second refrigerant is transferred into the first refrigerant while passing through the cascade heat exchanger 15, and thus the second refrigerant is condensed. Also, the second refrigerant absorbs heat from the indoor air while passing through the indoor heat exchanger 17, and thus the second refrigerant is evaporated.

When the hot water supply apparatus 1 associated with the heat pump is operated in the heating mode, the second refrigerant circulation part 12 may include the second compressor 121 compressing the second refrigerant, a condenser 17 for heating (hereinafter, referred to as a heating condenser) in which the second refrigerant discharged from the second compressor 121 releases heat into the indoor space, and thus is condensed, the second expander 124 in which the second refrigerant passing through the heating condenser 17 is expanded, and the second evaporator 15 in which the second refrigerant passing through the second expander 124 is evaporated.

In this instance, the heating condenser 17 corresponds to the indoor heat exchanger 17, and the second evaporator 15 corresponds to the cascade heat exchanger 15. That is, the cascade heat exchanger 15 may function as a cascade condenser 15 in the first refrigerant cycle and the second evaporator 15 in the second refrigerant cycle. Also, the cascade heat exchanger 15 may include passages for the first refrigerant and the second refrigerant that are independently defined to exchange heat between the first refrigerant and the second refrigerant. For example, various heat exchangers such as a plate type heat exchanger may be applied as the cascade heat exchanger.

The hot water supply device 13 includes a water supply passage 131 through which water is supplied to the water supply storage device 132, the hot water supply condenser 16 received in the water supply storage part 132 to heat the water using the first refrigerant, an auxiliary heating source 133 that augments the heating of the water if a heating amount of the hot water supply condenser 16 is insufficient, and a water discharge passage 134 that supplies the heated water to a user.

The water supply passage 131 may be connected to various water supply sources such as, for example, a water tank, an external water supply source, and the like. The auxiliary heating source 133 may include various different types of water heating sources, such as, for example, an electric heater and the like.

The heating device 14 includes the indoor heat exchanger 17 disposed adjacent to the indoor space to exchange heat between the second refrigerant and the indoor air. The indoor heat exchanger 17 may include an air-conditioning heat exchanger 171 that performs heat exchange between the indoor air and the second refrigerant and a bottom surface heat exchanger 172 that performs heat between a bottom surface of the indoor space, such as the floor, and the second refrigerant.

The air-conditioning heat exchanger 171 may be, for example, a fan coil unit in which the indoor air is heated by the second refrigerant. The floor heat exchanger 172 may have various shapes such as a case in which a refrigerant pipe through which the second refrigerant flows is installed in the bottom surface, or floor, of the indoor space, to heat the floor using the second refrigerant.

The air-conditioning heat exchanger 171 and the floor heat exchanger 172 may be connected to each other in parallel in the second refrigerant cycle. In more detail, the second refrigerant pipe 120 may be branched into two branch pipes 141 and 142 at one position between the second flow switch 125 and the second expander 124 in the second refrigerant cycle. The branch pipes 141 and 142 may be joined with each other at another position between the second flow switch 125 and the second expander 124 in the second refrigerant cycle. The air-conditioning heat exchanger 171 may be installed on one 141 of the two branch pipes 141 and 142, and the floor heat exchanger 172 may be installed on the other 142 of the two branch pipes 141 and 142.

Three-way valves 143 and 144 may be disposed at the positions at which the second refrigerant pipe 120 is branched into the two branch pipes 141 and 142. The three-way valves 143 and 144 may switch a flow direction of the second refrigerant toward at least one of the two branch pipes 141 and 142 to allow the second refrigerant to selectively flow into the two branch pipes 141 and 142. That is, according to the switch states of the three-way valves 143 and 144, the second refrigerant may flow into one of the air-conditioning heat exchanger 171 or the bottom heat exchanger 172, or into both of the air-conditioning heat exchanger 171 and the bottom heat exchanger 172.

Hereinafter, refrigerant flow in the hot water supply apparatus associated with the heat pump according to the embodiment shown in FIG. 1 will be described in detail.

In particular, refrigerant flow in a case in which the hot water supply apparatus is simultaneously operated in a hot water supply mode and a heating mode will be described below.

First, in the first refrigerant circulation part 11, the first refrigerant discharged from the first compressor 111 sequentially flows into the hot water supply condenser 16 and the cascade condenser 15. Thus, the first refrigerant introduced into the hot water supply condenser 16 may be introduced at a relatively high-temperature when compared to the first refrigerant introduced into the first cascade condenser 15.

In more detail, the first refrigerant discharged from the first compressor 111 undergoes primary condensation in the hot water supply condenser 16 while heating the supplied water. The first refrigerant passing through the hot water supply condenser 16 is introduced into the cascade condenser 15 via the first flow switch 115. Then, the first refrigerant undergoes secondary condensation in the cascade condenser 15 while transferring heat into the second refrigerant. The first refrigerant passing through the cascade condenser 15 is expanded while passing through the first expander 114. Then, the first refrigerant passes through the first flow switch 115 and is introduced again into the first compressor 111.

Since the first refrigerant undergoes primary condensation in the hot water supply condenser 16 before being introduced into the cascade condenser 15, the first refrigerant introduced into the hot water supply condenser 16 may have a temperature greater than that of the first refrigerant introduced into the cascade condenser 15.

Next, in the second refrigerant circulation part 12, the second refrigerant discharged from the second compressor 121 is introduced into the heating condenser 17 via the second flow switch 125. The second refrigerant is condensed in the heating condenser 17 while transferring heat to the indoor air. The second refrigerant is then expanded while passing through the second expander 124 and thereafter introduced into the second evaporator 15. The second refrigerant introduced into the second evaporator 15 absorbs heat from the first refrigerant, and is evaporated. The second refrigerant passing through the second evaporator 15 is introduced again into the second compressor 121 via the second flow switch 125.

Depending on the positions of the three-way valves 143 and 144, the second refrigerant may pass through one of the air heating part of the heating device 14 or the floor heating part of the heating device 14, or both the air heating part and the floor heating part of the heating device 14. That is, in some cases, at least one of the heating of the indoor air and the heating of the indoor floor may be selectively performed.

In the hot water supply device 13, the water stored in the water supply storage device 132 is heated by the first refrigerant to generate hot water. The heated water may be supplied to the user through the water discharge passage 134. If the water stored in the water supply storage device 132 is insufficient, water supply may be supplemented through the water supply passage 131.

Also, if a heating amount of the first refrigerant is insufficient for heating the water up to a target temperature, the auxiliary heating source 133 may be operated to supplement the heating of the water. The target temperature may be an adequate hot water temperature determined the user or a temperature preset by the user or an installer.

The heat pump 10 may include various units for the flow of the first refrigerant and the second refrigerant such as the first compressor 111, the second compressor 121, the outdoor heat exchanger 113, and the cascade heat exchanger 15. In the heat pump 10, the hot water supply device 13 and the heating device 14 are connected to the first refrigerant pipe 110 and the second refrigerant pipe 120, respectively so that the heat pump 10 circulates the first refrigerant and the second refrigerant to absorb heat from the indoor air and transfer the absorbed heat into the hot water supply device 13 and the heating device 14. When the hot water supply apparatus 1 associated with the heat pump is operated in the cooling mode, the circulation directions of the first refrigerant and the second refrigerant may be reversed to absorb heat from the indoor air.

In this embodiment, both the hot water supply performance and the heating performance may be improved.

In detail, generally, a required hot water temperature is greater than a required indoor air temperature. Also, in a general refrigerant cycle, a temperature of a refrigerant discharged from a compressor is the highest. In this embodiment, the first refrigerant discharged from the first compressor 111 sequentially flows into the hot water supply condenser 16 and the cascade condenser 15. That is, hot water supply is performed using the first refrigerant having the highest temperature in the first refrigerant cycle. Thus, the water within the hot water supply device 13 may be heated up to the possible highest temperature of the first refrigerant so that hot water supply performance may be further improved.

Also, since the first refrigerant passing through the hot water supply condenser 16 is introduced into the cascade condenser 15, a temperature the first refrigerant introduced into the cascade condenser 15 is less than that of the first refrigerant discharged from the first compressor 111. That is, when the indoor air is directly heated using the cascade condenser 15, heating performance may be deteriorated when compared to an instance in which the first refrigerant discharged from the first compressor 111 is directly introduced into the cascade condenser 15.

In this embodiment, since the indoor air is heated using the heating condenser 17 of the second refrigerant circulation part 12, heating performance may be further improved due to the two-stage refrigerant cycle including the first refrigerant cycle and the first refrigerant cycle. That is, heating is performed using the heating condenser 17 in which the second refrigerant discharged from the second compressor 121 flows. Also, in the two-stage refrigerant cycle, the first refrigerant discharged from the first compressor 111 has a temperature greater than that of the second refrigerant discharged from the second compressor 121. Thus, deterioration in heating performance occurring when the first refrigerant sequentially flows into the hot water supply condenser 16 and the cascade condenser 15 may be compensated for, and heating performance may be improved when compared to heating using the first refrigerant discharged from the first compressor 111.

Also, in this embodiment, hot water supply may be continuously performed regardless of the switching of the heating and cooling operations.

In detail, a flow of the refrigerant when the hot water supply apparatus 1 associated with the heat pump performs the hot water supply operation and the cooling operation at the same time will described. First, in the first refrigerant circulation part 11, the refrigerant discharged from the first compressor 111 sequentially flows into the hot water supply heat exchanger 16, the first flow switch 115, the outdoor heat exchanger 113, the first expander 114, the cascade heat exchanger 15, and the first flow switch 115. In the second refrigerant circulation part 12, the refrigerant discharged from the second compressor 121 sequentially flows into the second flow switch 125, the cascade heat exchanger 15, the second expander 124, the indoor heat exchanger 17, and the second flow switch 125.

That is, depending on the positions of the first flow switch 115 and the second flow switch 125, the hot water supply apparatus 1 may perform one of the heating mode or the cooling mode. Since the hot water supply heat exchanger 16, i.e., the hot water supply condenser 16 is disposed between the first compressor 111 and the first flow switch 115 in the first refrigerant cycle, the first refrigerant discharged from the first compressor 111 may be introduced into the hot water supply heat exchanger 16, i.e., the hot water supply condenser 16, regardless of the position of the first flow switch 115. In addition, since the first refrigerant discharged from the first compressor 111 is introduced into the hot water supply heat exchanger 16, i.e., the hot water supply condenser 16 regardless of whether the heating or cooling operation is performed, the hot water supply operation may be continuously performed.

Hereinafter, a hot water supply apparatus associated with a heat pump according to another embodiment will be described in detail with reference to FIG. 2. This embodiment is different from the embodiment shown in FIG. 1 in that water to be supplied as hot water to a user is heated using water heat-exchanged with a first refrigerant. In this embodiment, description of parts that are the same as or similar to those of the embodiment shown in FIG. 1 will be taken from the description of the embodiment shown in FIG. 1.

Figure 2:
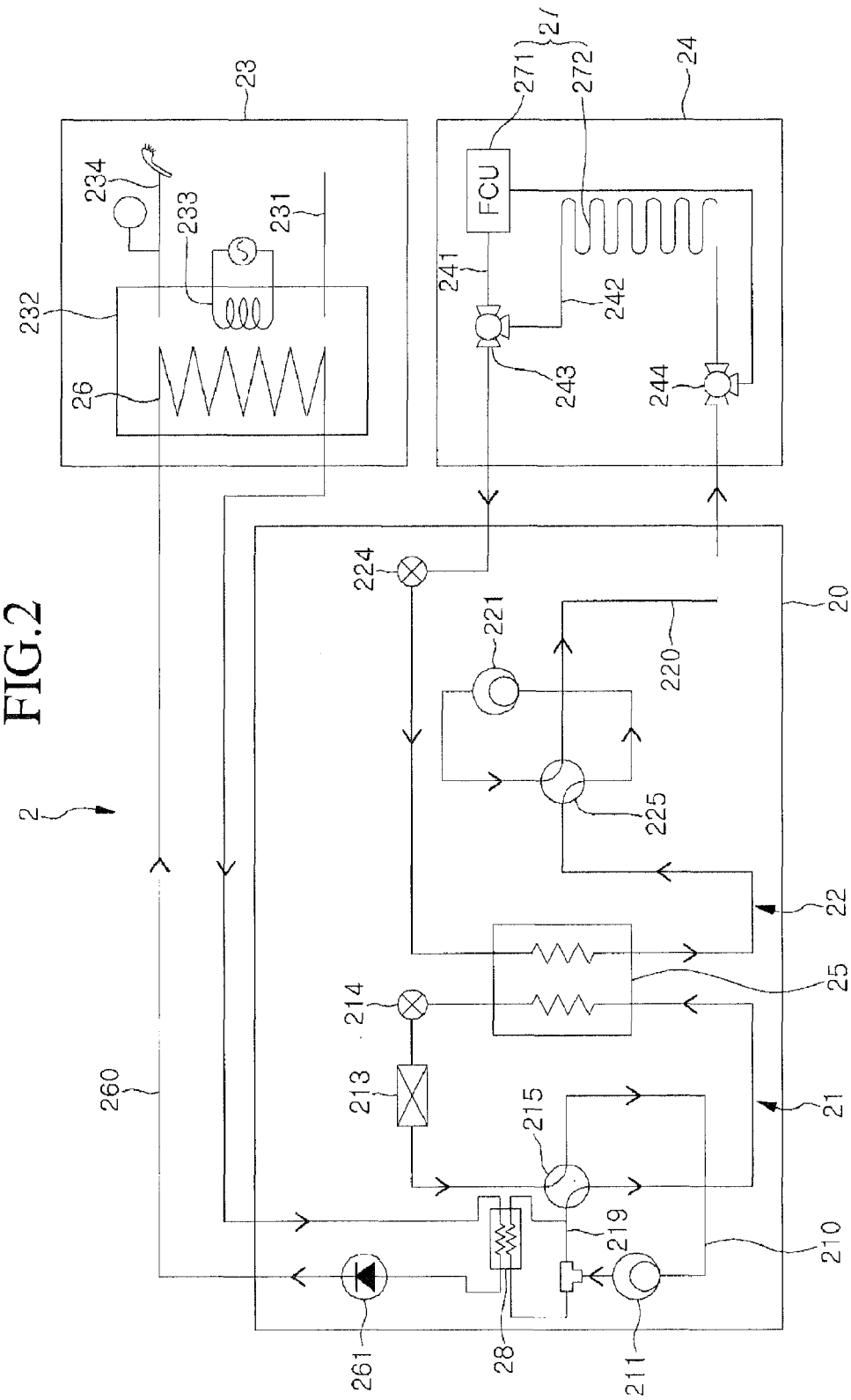
FIG. 2 is a schematic view of a hot water supply apparatus associated with a heat pump according to another embodiment as broadly described herein.

A hot water supply apparatus 2 associated with a heat pump as shown in FIG. 2, in accordance with another embodiment as broadly described herein, may include a water refrigerant heat exchanger 28 that performs heat exchange between the first refrigerant and the water, a water pipe 260 in which the water that has undergone heat exchange with the first refrigerant in the water refrigerant heat exchanger 28 is circulated, and a pump 261 for forcibly circulating the water within the water pipe 260. Since a portion of the water pipe 260 is received into a water supply storage device 232 of a hot water supply device 23, the water flowing into the water pipe 260 may heat water stored in the water storage device 232. Here, the water refrigerant heat exchanger 28 and the pump 261 may be installed in a heat pump 20 including first and second refrigerant circulation parts 21 and 22.

A water flow within the water pipe 260 will be described. In the water refrigerant heat exchanger 28, the water absorbing heat from the first refrigerant flows along the water pipe 260. Then, the water heats the water stored in the water supply storage device 232 while flowing into the portion of the water pipe 260 received in the water supply storage device 232, and then is introduced again into the water refrigerant heat exchanger 28 along the water pipe 260.

The first refrigerant circulation part 21 includes the water refrigerant heat exchanger 28 installed on a first refrigerant pipe 210, a bypass pipe 219 bypassing the water refrigerant heat exchanger 28, and a hot water supply flow adjustment device 282 for adjusting an amount of the first refrigerant discharged from a first compressor 211 and introduced into the water refrigerant heat exchanger 28 and the bypass pipe 219. The hot water supply flow adjustment device 282 adjusts an amount of refrigerant introduced into the water refrigerant heat exchanger 28 and an amount of the refrigerant flowing into the bypass pipe 219 of the first refrigerant discharged from the first compressor 211 to switch a hot water supply operation through the first refrigerant.

In more detail, in a case in which the hot water supply is performed using the first refrigerant, since the hot water supply flow adjustment device 282 intercepts a flow of the first refrigerant flowing toward the bypass pipe 219, the first refrigerant discharged from the first compressor 211 is introduced into the water refrigerant heat exchanger 28. Then, the heat of the first refrigerant is transferred into the water while passing through the water refrigerant heat exchanger 28, thus undergoing primary condensation. The first refrigerant passing through the water refrigerant heat exchanger 28 undergoes secondary condensation while passing through a cascade heat exchanger 25 via a first flow switch 215.

In this mode, the water refrigerant heat exchanger 28 corresponds to a hot water supply condenser 28 in which the first refrigerant is primarily condensed while performing the hot water supply operation, and the cascade heat exchanger 25 corresponds to a cascade condenser 25 in which the heat of the first refrigerant is transferred into a second refrigerant, and thus, the first refrigerant is secondarily condensed.

In a case in which the hot water supply operation using the first refrigerant is not performed, for example, in an exclusive heating operation, since the hot water supply flow adjustment device 282 intercepts a flow of the first refrigerant toward the water refrigerant heat exchanger 28, the first refrigerant discharged from the first compressor 211 may, in this situation, bypass the water refrigerant heat exchanger 28 and be introduced into the first flow switch 215. The heat of the first refrigerant passing through the first flow switch 215 is transferred into the second refrigerant while passing through the cascade heat exchanger 25, and thus, the first refrigerant is condensed.

In this embodiment, the first refrigerant discharged from the first compressor 211 selectively flows into the water refrigerant heat exchanger 28 or the bypass pipe 219 so as to selectively perform the hot water supply function.

When the hot water supply is required, the hot water supply flow adjustment device 282 may intercept the flow of the first refrigerant toward the bypass pipe 219 to perform the hot water supply using the first refrigerant having the highest temperature in the first refrigerant cycle. That is, since a temperature of hot water supplied by the hot water supply operation is heated up to the highest possible temperature through the first refrigerant, performance the hot water supply function may be further improved.

When the exclusive heating operation is performed, the hot water supply flow adjustment device 282 may intercept the flow of the first refrigerant toward the water refrigerant heat exchanger 28 to directly introduce the first refrigerant discharged from the first compressor 211 into the cascade heat exchanger 25. Thus, a temperature of the first refrigerant introduced into the cascade heat exchanger 25 may be further increased when compared to a case in which the refrigerant discharged from the first compressor 211 passes through the water refrigerant heat exchanger 28 and then is secondarily condensed in the cascade heat exchanger 25. Therefore, the heating performance may be further improved when compared that the heating operation is performed by the first refrigerant passing through the water refrigerant heat exchanger 28. A case in which exclusive heating is performed may be, for example, a case in which an amount of hot water heated and stored in the hot water supply device 23 is sufficient to meet demands and a heating load is relatively large.

Also, in this embodiment, since the heat pump 20 and the hot water supply device 23 are connected to the water pipe 260, rather than to the refrigerant pipe, an amount of the first refrigerant flowing into the first refrigerant circulation part 21 may be reduced. Thus, an amount of refrigerant required for performing the hot water supply operation may be reduced.

Also, since the water pipe 260 may be easily installed and replaced when compared to the refrigerant pipe 210, the hot water supply apparatus 2 associated with the heat pump may be easily installed and replaced.

The hot water supply apparatus 2 associated with the heat pump in accordance with the embodiment shown in FIG. 2 may also include an outdoor heat exchanger 213, a first expander 214, a second refrigerant pipe 220, a second compressor 221, a second expander 224, a second flow adjustment device 225, a first hot water supply heat exchanger 26, a water supply passage 231, an auxiliary heating source 233, a hot water discharge passage 234, and a heating device 24 including an indoor heat exchanger 27 having an air conditioning heat exchanger 271 and a floor heat exchanger 272, branch pipes 241 and 242, and three way valves 243 and 244. These components are similar to corresponding components discussed above with respect to previous embodiment(s), and thus further detailed description will be omitted.

Hereinafter, a hot water supply apparatus associated with a heat pump according to another embodiment will be described in detail with reference to FIG. 3. This embodiment is different from the embodiment shown in FIG. 1 in that hot water supply is performed using water that undergoes heat exchange with a second refrigerant. In this embodiment, description of parts that are the same as or similar to those of the embodiment shown in FIG. 1 will be taken from the description of the embodiment shown in FIG. 1.

Figure 3:
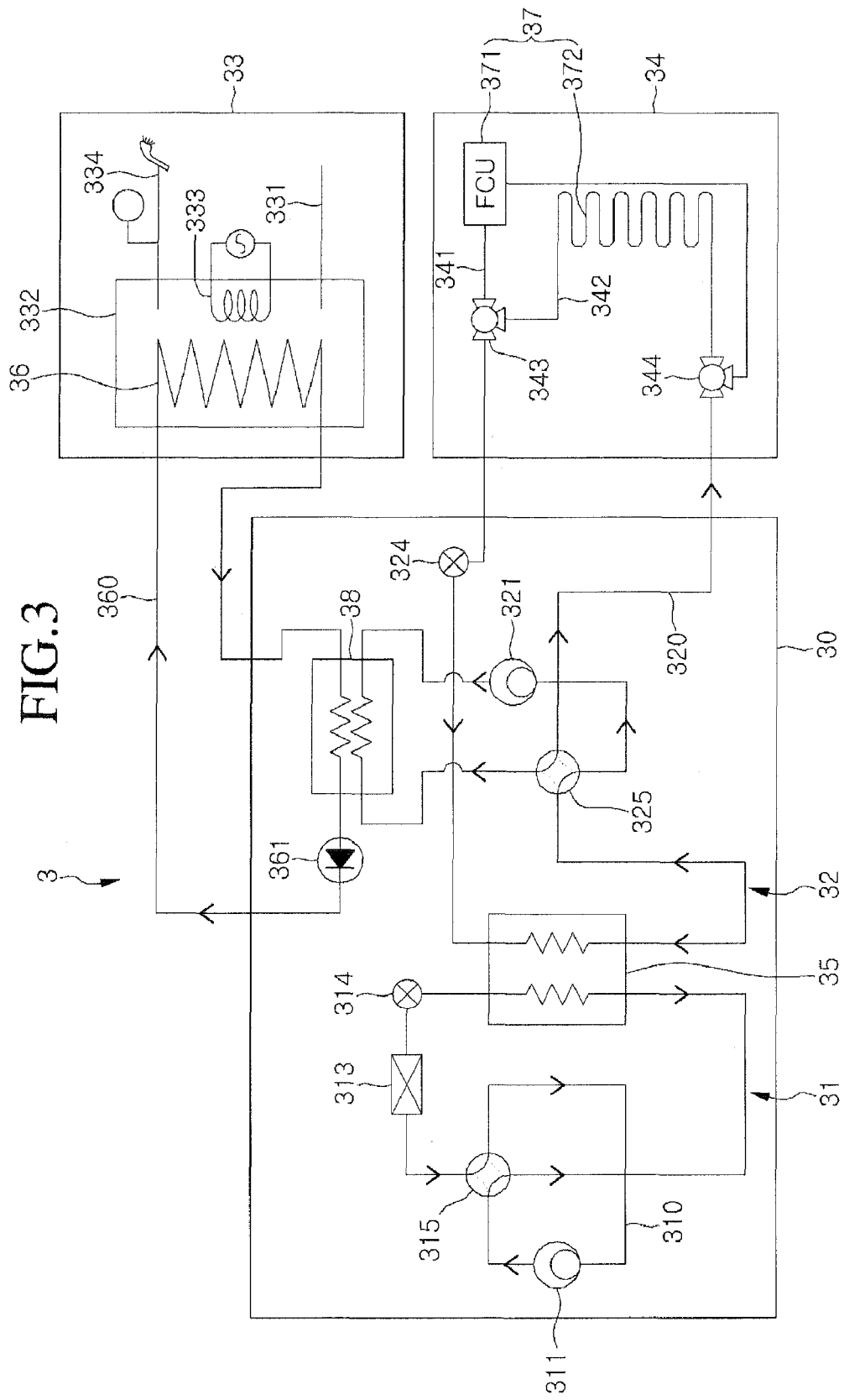
FIG. 3 is a schematic view of a hot water supply apparatus associated with a heat pump according to another embodiment as broadly described herein.

A hot water supply apparatus 3 associated with a heat pump as shown in FIG. 3, in accordance with another embodiment as broadly described herein, may include a water refrigerant heat exchanger 38 that performs exchange heat between the high-temperature second refrigerant discharged from a second compressor 321 and the water, a water pipe 360 in which the water that has undergone heat exchange with the second refrigerant in the water refrigerant heat exchanger 38 is circulated, and a pump 361 for forcibly circulating the water within the water pipe 360. Since a portion of the water pipe 360 is received in a water supply storage device 332 of a hot water supply device 33, the water flowing into the water pipe 360 may heat water stored in the water storage device 332. The water refrigerant heat exchanger 38 and the pump 361 may be installed in a heat pump 30 including first and second refrigerant circulation parts 31 and 32.

A water flow within the water pipe 360 will be described. In the water refrigerant heat exchanger 38, the water absorbing heat from the first refrigerant flows along the water pipe 360. Then, the water heats the water stored in the water supply storage device 332 while flowing into the portion of the water pipe 360 received in the water supply storage device 332, and is then introduced again into the water refrigerant heat exchanger 38 along the water pipe 360.

The second refrigerant circulation part 32 may have the water refrigerant heat exchanger 38 installed on a second refrigerant pipe 320, between the second compressor 321 and a second flow switch 325 in a second refrigerant cycle.

Thus, the heat of the second refrigerant discharged from the second compressor 321 is transferred into the water while passing through the water refrigerant heat exchanger 38, and the second refrigerant undergoes primary condensation. Then, the condensed second refrigerant is introduced into an indoor heat exchanger 37 of a heating device 34 via the second flow switch 325. The heat of the second refrigerant is transferred to indoor air as it passes through the indoor heat exchanger 37, and thus, the second refrigerant undergoes secondary condensation.

In this embodiment, the water refrigerant heat exchanger 38 corresponds to a hot water supply condenser 38 in which the second refrigerant is primarily condensed while performing the hot water supply operation, and the indoor heat exchanger 37 corresponds to a heating condenser 37 in which the heat of the second refrigerant is transferred to the indoor air, and thus, the refrigerant is secondarily condensed.

Thus, this embodiment is different from the embodiment shown in FIG. 1 in that the second refrigerant circulation part 32 includes the hot water supply condenser 38.

In the first refrigerant circulation part 31, a first refrigerant discharged from a first compressor 311 is directly introduced into a cascade heat exchanger 35 via a first flow switch 315.

In this embodiment, hot water supply performance may be further improved. In more detail, in first and second refrigerant cycles, a temperature of the second refrigerant discharged from the second compressor 321 is greater than that of the first refrigerant discharged from the first compressor 311. Since the hot water supply operation is performed using the second refrigerant discharged from the second compressor 321, rather than the first refrigerant discharged from the first compressor 311, hot water supply performance may be relatively improved.

Also, since the heat pump 30 and the hot water supply device 33 are connected to the water pipe 360, rather than to the refrigerant pipe, an amount of the second refrigerant flowing into the second refrigerant circulation part 32 may be reduced. Thus, an amount of refrigerant required for performing the hot water supply operation may be reduced.

Also, since the water pipe 360 may be easily installed and replaced when compared to the refrigerant pipe, the hot water supply apparatus 3 associated with the heat pump may be easily installed and replaced.

The hot water supply apparatus 3 associated with the heat pump in accordance with the embodiment shown in FIG. 3 may also include a first refrigerant pipe 310, an outdoor heat exchanger 313, a first expander 314, a first hot water supply heat exchanger 36, a water supply passage 331, an auxiliary heating source 333, a hot water discharge passage 334, an air conditioning heat exchanger 371 and a floor heat exchanger 372, branch pipes 341 and 342, and three way valves 343 and 344. These components are similar to corresponding components discussed above with respect to previous embodiment(s), and thus further detailed description will be omitted.

Hereinafter, a hot water supply apparatus associated with a heat pump according to another embodiment will be described in detail with reference to FIG. 4. This embodiment is different from the embodiment shown in FIG. 1 in that hot water supply is performed using a first refrigerant as well as a second refrigerant. In this embodiment, description of parts that are the same as or similar to those of the embodiment shown in FIG. 1 will be taken from the description of the embodiment shown in FIG. 1.

Figure 4:
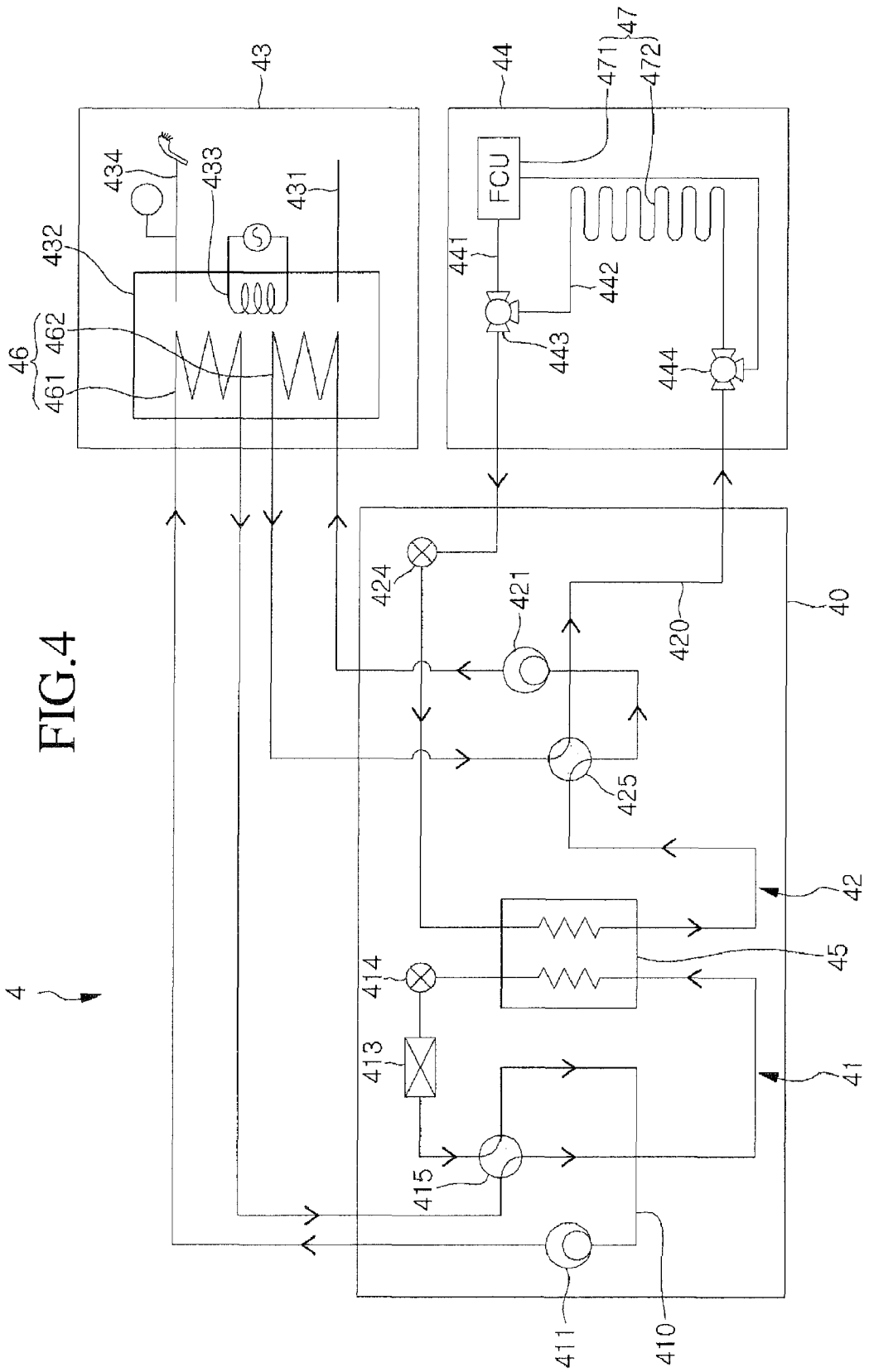
FIG. 4 is a schematic view of a hot water supply apparatus associated with a heat pump according to another embodiment as broadly described herein.

A hot water supply apparatus 4 associated with a heat pump 40 as shown in FIG. 4, in accordance with another embodiment as broadly described herein, may include first and second refrigerant circulation parts 41 and 42. The first refrigerant circulation part 41 may include a hot water supply heat exchanger 46, or condenser, including a first hot water supply condenser 461 in which heat is transferred from the first refrigerant to water. The second refrigerant circulation part 42 may include a second hot water supply condenser 462 in which heat is transferred from the second refrigerant to water in the hot water supply heat exchanger 46. Here, the second hot water supply condenser 462 may correspond to an auxiliary hot water supply condenser 462 in that the hot water supply operation is performed using the second hot water supply condenser 462 together with the first hot water supply condenser 461.

The second hot water supply condenser 462 is installed between a second compressor 421 and a second flow switch 425 in a second refrigerant cycle. Thus, the heat of the second refrigerant discharged from the second compressor 421 is transferred into water while passing through the second hot water supply condenser 462, so that the second refrigerant is primarily condensed. Then, the condensed second refrigerant is introduced into a heating condenser 47 of a heating device 44 via the second flow switch 425. The heat of the second refrigerant is transferred to indoor air while passing through the heating condenser 47, and thus, the second refrigerant is secondarily condensed.

Similarly, the first hot water supply condenser 461 is installed between a first compressor 411 and a first flow switch 415 in the first refrigerant cycle.

In this embodiment, the first hot water supply condenser 461 corresponds to a first hot water heat exchanger 461 in which a portion of a first refrigerant pipe 410 is received in a water supply storage device 432 of a hot water supply device 43, and the second hot water supply condenser 462 corresponds to a second hot water heat exchanger 462 in which a portion of a second refrigerant pipe 420 is received in the water supply storage device 432.

In this embodiment, hot water supply performance may be improved. In more detail, since the water is heated by the second refrigerant as well as the first refrigerant, an amount of heating available for heating the water may be increased, thus improving overall hot water supply performance.

Furthermore, in the first and second refrigerant cycles, a temperature of the second refrigerant discharged from the second compressor 421 is greater than that of the first refrigerant discharged from the first compressor 411. That is, since the water is heated by the second refrigerant having the temperature greater than that of the first refrigerant, as well as the first refrigerant, hot water supply performance may be further improved.

The hot water supply apparatus 4 associated with the heat pump in accordance with the embodiment shown in FIG. 4 may also include a cascade heat exchanger 45, an outdoor heat exchanger 413, a first expander 414, a second expander 424, a water supply passage 431, an auxiliary heating source 433, a hot water discharge passage 434, an air conditioning heat exchanger 471 and a floor heat exchanger 472, branch pipes 441 and 442, and three way valves 443 and 444. These components are similar to corresponding components discussed above with respect to previous embodiment(s), and thus further detailed description will be omitted.

Hereinafter, a hot water supply apparatus associated with a heat pump according to another embodiment will be described in detail with reference to FIGS. 5 and 6. This embodiment is different from the embodiment shown in FIG. 1 in that hot water supply and heating operations may each be continuously performed while also performing a defrosting operation. In this embodiment, description of parts that are the same as or similar to those of the embodiment shown in FIG. 1 will be taken from the description of the embodiment shown in FIG. 1.

Figure 5:
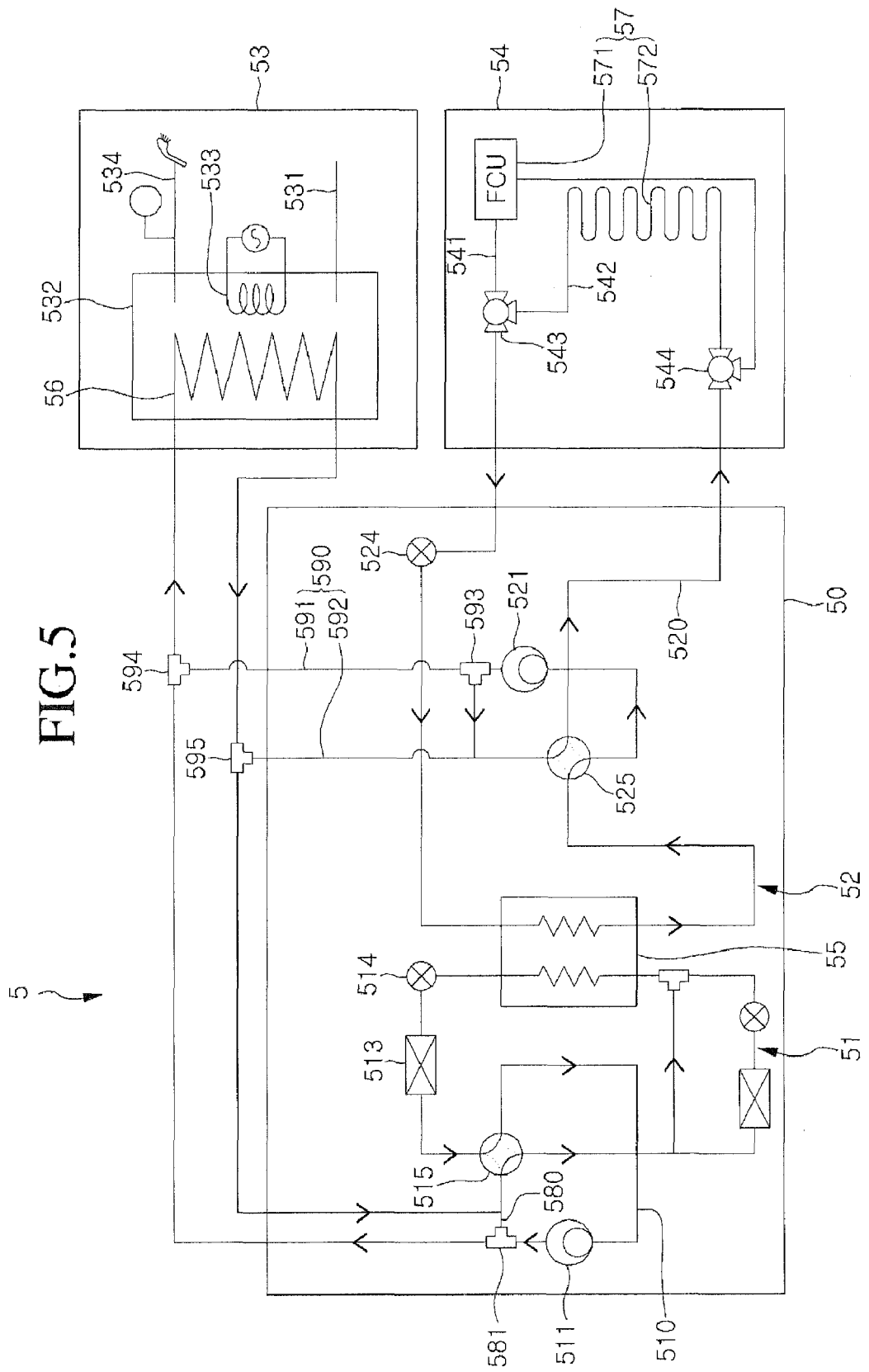
FIG. 5 is a schematic view illustrating refrigerant flow in a hot water supply apparatus associated with a heat pump during ordinary operation according to an embodiment as broadly described herein.
Figure 6:
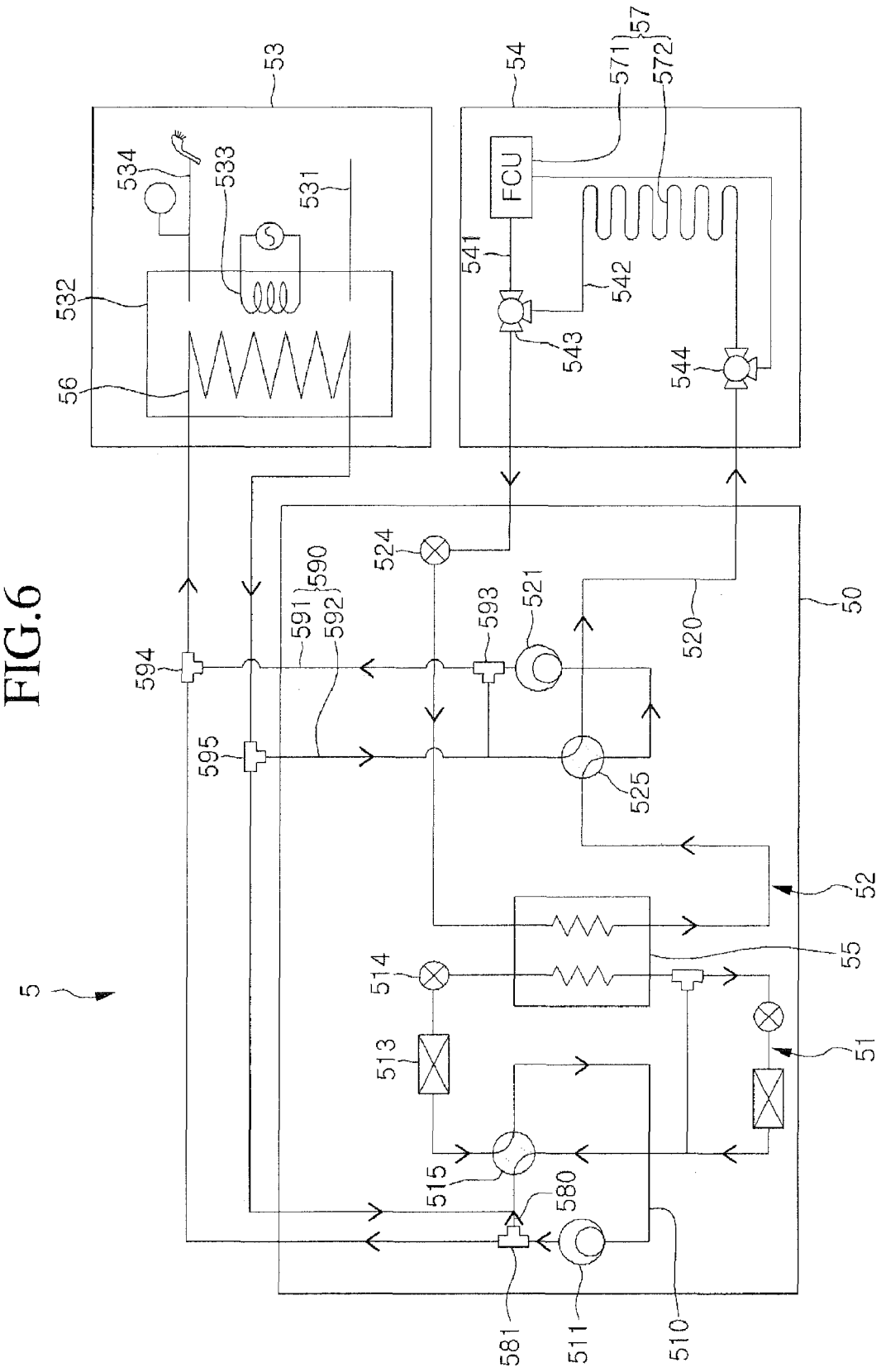
FIG. 6 is a schematic view illustrating refrigerant flow in the hot water supply apparatus associated with the heat pump during a defrosting operation.

FIG. 5 is a schematic view of refrigerant flow during ordinary operation of a hot water supply apparatus associated with a heat pump, in accordance with another embodiment as broadly described herein, and FIG. 6 is a schematic view of refrigerant flow in case where the hot water supply device associated with the heat pump performs during a defrosting operation of the hot water supply apparatus associated with the heat pump, in accordance with this embodiment.

As shown in FIGS. 5 and 6, the hot water supply apparatus 5 may include a heat pump 50 having first and second refrigerant circulation parts 51 and 52. The first refrigerant circulation part 51 includes a bypass pipe 580 for guiding a first refrigerant to bypass a hot water supply condenser 56 and a first hot water supply flow adjustment device 581 for adjusting an amount of the first refrigerant discharged from a first compressor 511 and introduced into the hot water supply condenser 56 and an amount of the first refrigerant flowing into the bypass pipe 580.

The hot water supply apparatus 5 also includes an auxiliary hot water supply pipe 590 connecting the first refrigerant circulation part 51 and the second refrigerant circulation part 52 to each other. The auxiliary hot water supply pipe 590 includes a first auxiliary hot water supply pipe 591 connecting a first of a second refrigerant pipe 520 corresponding to a discharge side of a second compressor 521 to a first portion of a first refrigerant pipe 510 corresponding to an inflow side of the hot water supply condenser 56, and a second auxiliary hot water supply pipe 592 connecting a second portion of the first refrigerant pipe 510 corresponding to a discharge side of the hot water supply condenser 56 to a second portion of the second refrigerant pipe 520 corresponding to an inflow side of a second flow switch 525 to each other.

A second hot water supply flow adjustment device 593 for adjusting an amount of the second refrigerant discharged from the second compressor 521 and introduced into a hot water supply device 53 through the first auxiliary hot water supply pipe 591 and an amount of the second refrigerant directly introduced into the second flow switch 525 is installed at the first portion of the second refrigerant pipe 520 connected to the first auxiliary hot water supply pipe 591. A third hot water supply flow adjustment device 594 and a fourth hot water supply flow adjustment device 595 for adjusting amounts of the first and second refrigerants introduced into the hot water supply condenser 56 are installed at the first of the first refrigerant pipe 510 connected to the first auxiliary hot water supply pipe 591 and the second portion of the first refrigerant pipe 510 connected to the second auxiliary hot water supply pipe 592, respectively.

In the embodiment shown in FIGS. 5 and 6, the hot water supply apparatus 5 associated with the heat pump may also include an auxiliary heat exchanger 582 used as an evaporator (instead of an outdoor heat exchanger 513) during a defrosting operation, an auxiliary expander 583 in which the first refrigerant is expanded (instead of a first expander 514) during the defrosting operation, an auxiliary refrigerant pipe 584 for bypassing the first refrigerant of the first refrigerant pipe 510 into the auxiliary heat exchanger 582 and the auxiliary expander 583, and an auxiliary flow adjustment device 585 for controlling the first refrigerant to flow along the first refrigerant pipe 510 or for bypassing the first refrigerant into the auxiliary refrigerant pipe 584.

A refrigerant flow in this embodiment will be described with reference to FIG. 5. First, when the hot water supply apparatus 5 associated with the heat pump performs an ordinary operation, a refrigerant flow similar to that of the embodiment show in FIG. 1 is performed. Such ordinary operation may include, for example, hot water supply, heating, and cooling operations. During ordinary operation, a flow of the first refrigerant through the bypass pipe 580 is intercepted by the first hot water supply flow adjustment device 581, and a flow of the second refrigerant through the auxiliary hot water supply pipe 590 is intercepted by the second hot water supply flow adjustment device 593, the third hot water supply flow adjustment device 594, and the fourth hot water supply flow adjustment device 595. A flow of the first refrigerant through the auxiliary refrigerant pipe 584 is intercepted by the auxiliary flow adjustment device 585.

Referring to FIG. 6, when the hot water supply apparatus 5 associated with the heat pump performs a defrosting operation, a flow of the first refrigerant toward the hot water supply condenser 56 is intercepted by the first hot water supply flow adjustment device 581, and a flow of the refrigerant directly introduced from the second compressor 521 into the second flow switch 525 is intercepted by the second hot water supply flow adjustment device 593. Also, a flow of the first refrigerant flowing toward the hot water supply condenser 56 is intercepted by the third hot water supply flow adjustment device 594 and the fourth hot water supply flow adjustment device 595, and simultaneously, the hot water supply condenser 56 and the second refrigerant pipe 520 communicate with each other to bypass the second refrigerant into the hot water supply condenser 56. The first refrigerant of the first refrigerant pipe 510 is bypassed by the auxiliary flow adjustment device 585 to pass through the auxiliary heat exchanger 582 and the auxiliary expander 583 along the auxiliary refrigerant pipe 584.

Thus, the first refrigerant discharged from the first compressor 511 is directly introduced into the first flow switch 515 and passes through the first flow switch 515, where it is introduced into the outdoor heater exchanger 513. The first refrigerant is primarily condensed during the defrosting operation while passing through the outdoor heat exchanger 513. Then, the heat of the first refrigerant is transferred to the second refrigerant while passing through the cascade heat exchanger 55, and thus, the first refrigerant is secondarily condensed. The first refrigerant passing through the cascade heat exchanger 55 is expanded in the auxiliary expander 583, absorbs heat from outdoor air while passing through the auxiliary heat exchanger 582, and is thus evaporated. At this point, the first expander 514 is opened to prevent the first refrigerant from being expanded, and the auxiliary expander 583 is partially opened to expand the first refrigerant. The first refrigerant passing through the auxiliary heat exchanger 582 is introduced again into the first compressor 511 via the first flow switch 515.

The second refrigerant discharged from the second compressor 521 is introduced into the hot water supply condenser 56 through the first auxiliary hot water supply pipe 591. The second refrigerant is primarily condensed while passing through the hot water supply condenser 56, and is then introduced into the second flow switch 525 through the second auxiliary hot water supply pipe 592. The second refrigerant passing through the second flow switch 525 is secondarily condensed while passing through an indoor heat exchanger 57 of a heating device 54 and is expanded in a second expander 524. Thereafter, the second refrigerant absorbs heat from the first refrigerant in the cascade heat exchanger 55, and is thus evaporated.

That is, the hot water supply operation is performed using the first refrigerant during ordinary operation, and the hot water supply operation is performed using the second refrigerant during the defrosting operation. In addition, the refrigerant flowing into the hot water supply condenser 56 is compressed by the first compressor 511 during ordinary operation, and the refrigerant flowing into the hot water supply condenser 56 is compressed by the second compressor 521 during the defrosting operation.

Thus, in this embodiment, the hot water supply and heating operations may be continuously performed during the defrosting operation.

The hot water supply apparatus 5 associated with the heat pump in accordance with the embodiment shown in FIGS. 5 and 6 may also include a first flow adjustment switch 515, a water supply passage 531, a hot water storage device 532, an auxiliary heating source 533, a hot water discharge passage 534, an air conditioning heat exchanger 571, a floor heat exchanger 572, a branch pipes 541, and three way valves 543 and 544. These components are similar to corresponding components discussed above with respect to previous embodiment(s), and thus further detailed description will be omitted.

Hereinafter, a hot water supply apparatus associated with a heat pump according to another embodiment will be described in detail with reference to FIG. 7. This embodiment is different from the embodiment shown in FIG. 1 in that a heating operation is performed using water that has undergone heat exchange with a second refrigerant. In this embodiment, description of parts that are the same as or similar to those of the embodiment shown in FIG. 1 will be taken from the description of the embodiment shown in FIG. 1.

Figure 7:
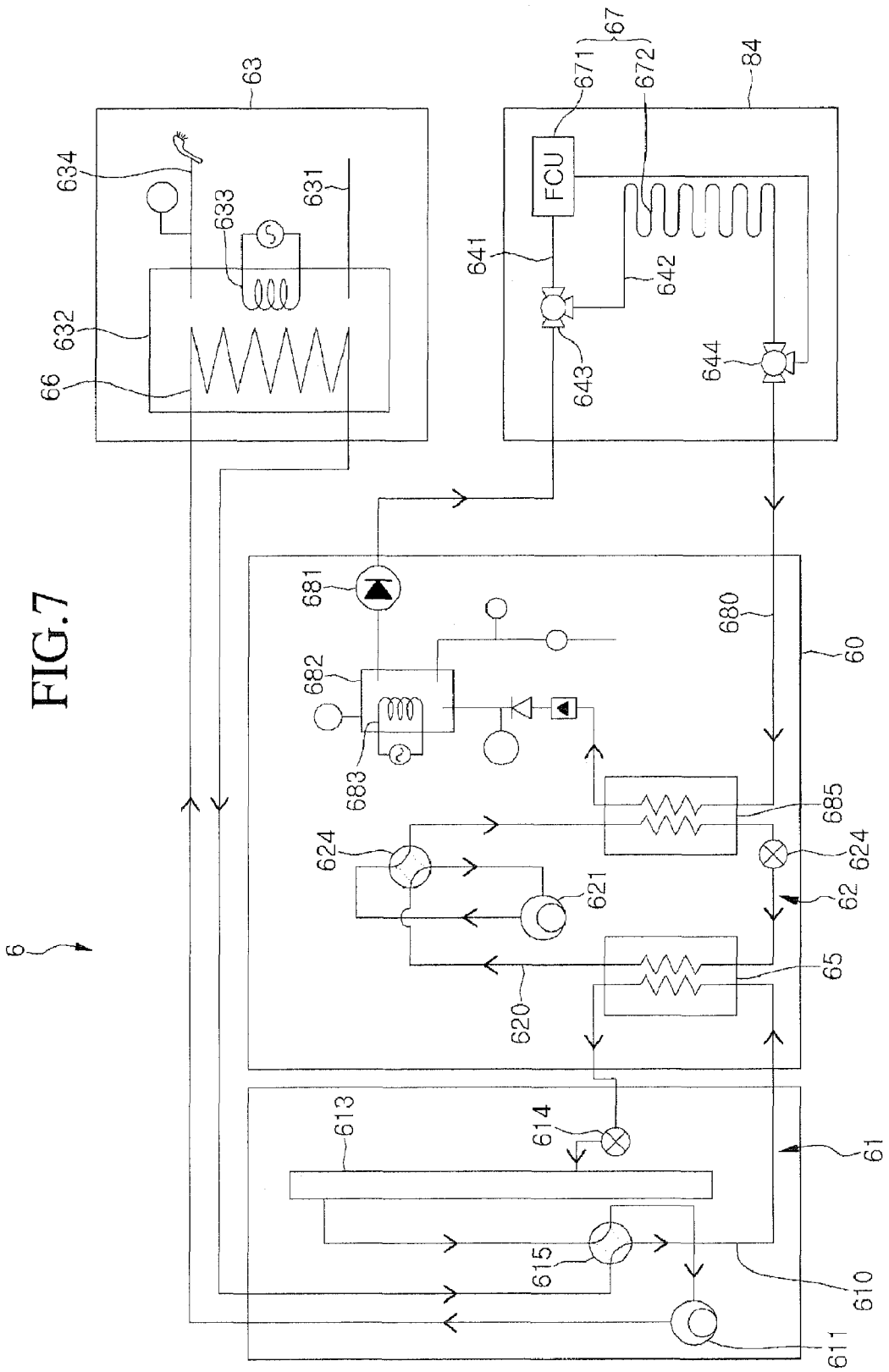
FIG. 7 is a schematic view of a hot water supply apparatus associated with a heat pump according to another embodiment as broadly described herein.

As shown in FIG. 7, a hot water supply apparatus 6 associated with a heat pump may include a water-refrigerant heat exchanger 685 that performs heat exchange between a high-temperature second refrigerant discharged from a second compressor 621 and water, a water pipe 680 in which the water that has undergone heat exchange with the second refrigerant in the water refrigerant heat exchanger 685 is circulated, and a pump 681 for forcibly circulating the water within the water pipe 680. A heating device 64 including an indoor heat exchanger 67 may be disposed at a side of the water pipe 680 to heat the water flowing into the indoor heat exchanger 67. In more detail, the indoor heat exchanger 67 includes an air-conditioning heat exchanger 671 exchanging heat between indoor air and the water and a bottom surface, or floor, heat exchanger 672 exchanging heat between a bottom surface of the indoor space, such as, for example, the floor, and the water. The water flowing into the air-conditioning heat exchanger 671 may heat the indoor air, and the water flowing into the floor heat exchanger 672 may heat the floor.

A water flow within the water pipe 680 will be described. In the water refrigerant heat exchanger 685, the water absorbing heat from the second refrigerant flows along the water pipe 680. The heat of the water is transferred to the indoor air as the water passes through the indoor heat exchanger 67, and the water is introduced again into the water refrigerant heat exchanger 685 along the water pipe 680.

In this embodiment, the water-refrigerant heat exchanger 685 may correspond to a heating condenser 685 in which the second refrigerant heats the water for heating and is condensed.

A flow switch 686 for detecting a water flow, an expansion tank 687 for buffering a water volume change, and a water collection tank 682 including an auxiliary heater 683 therein may also be provided on the water pipe 680. An air vent 688 for discharging overheated air is disposed at an upper side of the water collection tank 682, an pressure gauge 689 for displaying a pressure within the water collection tank 682, and a relief valve for adjusting the pressure within the water collection tank 682 when the pressure within the water collection tank 682 is excessively high may be disposed at a side of the water collection tank 682. Here, the water refrigerant heat exchanger 685, the pump 681, the flow switch 686, the expansion tank 687, the water collection tank 682 may be disposed in a heat pump 60 including first and second refrigerant circulation parts 61 and 62.

A refrigerant flow through the embodiment shown in FIG. 7 may be similar to that of the embodiment shown in FIG. 1.

In this embodiment, since the heat pump 60 and the heating device 64 are connected to the water pipe 680, rather than to a refrigerant pipe, an amount of the second refrigerant flowing into the second refrigerant circulation part 62 may be reduced. Thus, an amount of refrigerant required for performing the hot water supply operation may be reduced.

Also, since the water pipe 680 may be easily installed and replaced when compared to a refrigerant pipe, the hot water supply apparatus 6 associated with the heat pump as shown in FIG. 7 may be easily installed and replaced.

The hot water supply apparatus 6 associated with the heat pump in accordance with the embodiment shown in FIG. 7 may also include a first refrigerant pipe 610, a first compressor 611, an outdoor heat exchanger 613, a first expander 614, a first flow adjustment switch 615, a cascade heat exchanger 65, a second refrigerant pipe 620, a second expander 624, a second flow adjustment switch 625, a hot water supply device 63 including a first hot water supply heat exchanger 66, a water supply passage 631, a hot water storage device 632, an auxiliary heating source 633, a hot water discharge passage 634, branch pipes 641 and 642, and three way valves 643 and 644. These components are similar to corresponding components discussed above with respect to previous embodiment(s), and thus further detailed description will be omitted.

Hereinafter, a hot water supply apparatus associated with a heat pump according to another embodiment will be described in detail with reference to FIGS. 8 and 9. This embodiment is different from the embodiment shown in FIG. 7 in that hot water supply and heating operations are continuously performed during a defrosting operation. In this embodiment, description of parts that are the same as or similar to those of the embodiment shown in FIG. 7 will be taken from the description of the embodiment shown in FIG. 7.

Figure 8:
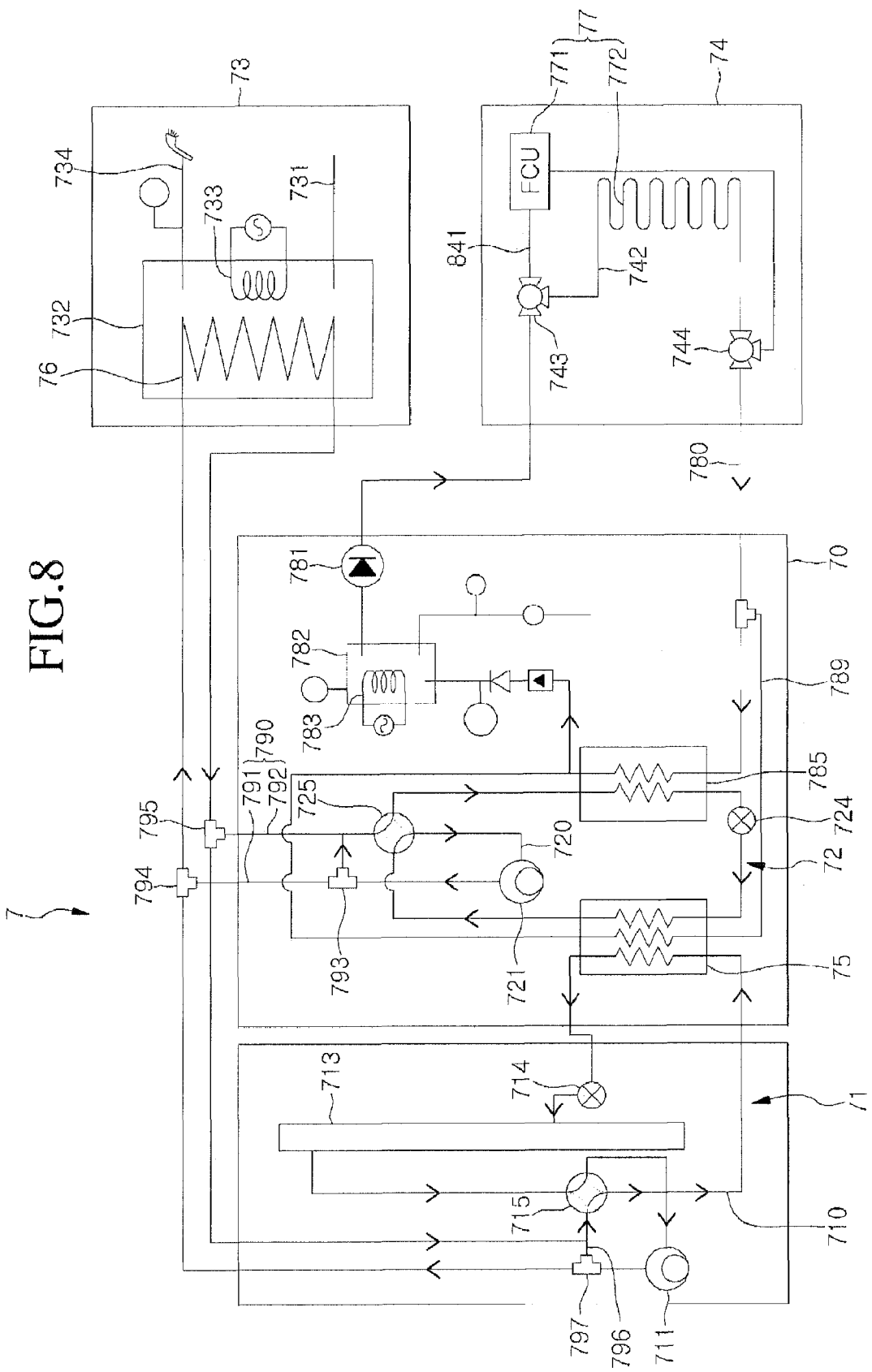
FIG. 8 is a schematic view illustrating refrigerant flow in a hot water supply apparatus associated with a heat pump during ordinary operation according to an embodiment as broadly described herein.
Figure 9:
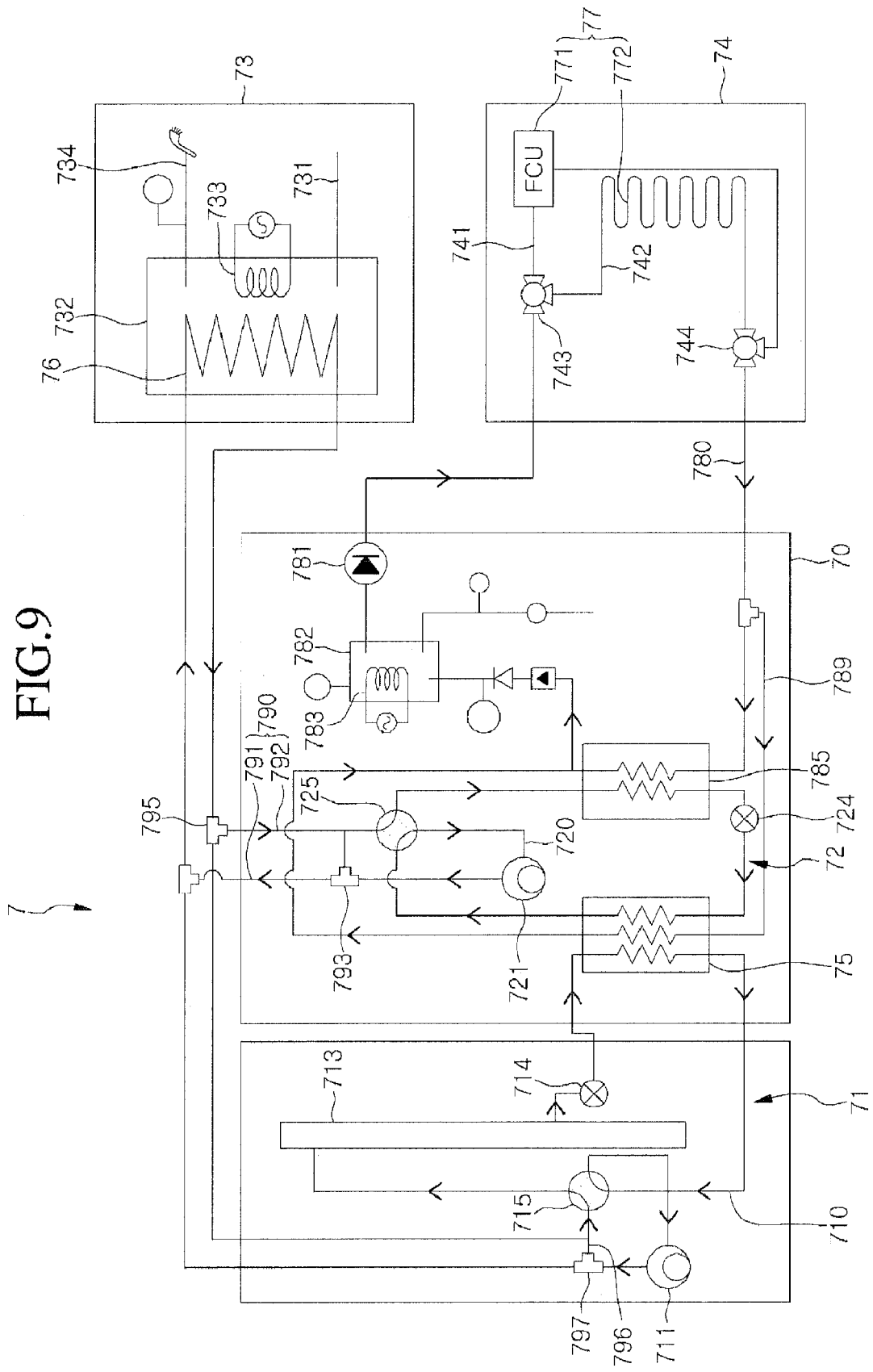
FIG. 9 is a schematic view illustrating refrigerant flow in the hot water supply apparatus associated with the heat pump during a defrosting operation as broadly described herein.

FIG. 8 is a schematic view of refrigerant flow during ordinary operation of a hot water supply apparatus associated with a heat pump as embodied and broadly described herein, and FIG. 9 is a schematic view of refrigerant flow as the hot water supply apparatus associated with the heat pump performs a defrosting operation.

As shown in FIGS. 8 and 9, the hot water supply apparatus 7 may include a heat pump 70 including first and second refrigerant circulation parts 71 and 72. The first refrigerant circulation part 71 may include a bypass pipe 796 for guiding a first refrigerant to bypass a hot water supply condenser 76 and a first hot water supply flow adjustment device 797 for adjusting an amount of the first refrigerant discharged from a first compressor 711 and introduced into the hot water supply condenser 76 and an amount of the first refrigerant flowing into the bypass pipe 796.

An auxiliary hot water supply pipe 790 may connect the first refrigerant circulation part 71 to the second refrigerant circulation part 72. The auxiliary hot water supply pipe 790 includes a first auxiliary hot water supply pipe 791 connecting a first portion of a second refrigerant pipe 720 corresponding to a discharge side of a second compressor 721 and a first portion of a first refrigerant pipe 710 corresponding to an inflow side of the hot water supply condenser 76 to each other, and a second auxiliary hot water supply pipe 792 connecting a second portion of the first refrigerant pipe 710 corresponding to a discharge side of the hot water supply condenser 76 and a second portion of the second refrigerant pipe 720 corresponding to an inflow side of a second flow switch 725 to each other.

A second hot water supply flow adjustment device 793 for adjusting an amount of the second refrigerant discharged from the second compressor 721 and introduced into a hot water supply device 73 through the first auxiliary hot water supply pipe 791 and an amount of the second refrigerant directly introduced into the second flow switch 725 is installed at the first portion of the second refrigerant pipe 720 connected to the first auxiliary hot water supply pipe 791. A third hot water supply flow adjustment device 794 and a fourth hot water supply flow adjustment device 795 for adjusting amounts of the first and second refrigerants introduced into the hot water supply condenser 76 are installed at the first portion of the first refrigerant pipe 710 connected to the first auxiliary hot water supply pipe 791 and the second portion of the first refrigerant pipe 710 connected to the second auxiliary hot water supply pipe 791, respectively.

In this embodiment, the hot water supply apparatus 7 associated with the heat pump may also include a bypass water pipe 789 for bypassing the water passing through a heating device 74 into a cascade heat exchanger 75 during the defrosting operation and a water flow adjustment device 788 for adjusting an amount of the water flowing toward the water refrigerant heat exchanger 785 and the cascade heat exchanger 75. In more detail, the bypass water pipe 789 is branched at a first portion of a water pipe 780 between an indoor heat exchanger 77 and the water refrigerant heat exchanger 785 and rejoins at the second portion of the water pipe 780 corresponding to a discharge side of the water refrigerant heat exchanger 785. The cascade heat exchanger 75 includes a first refrigerant passage 751 in which a first refrigerant flows, a second refrigerant passage 752 in which a second refrigerant flows, and a water passage 753 in which water flows to exchange heat with the first refrigerant in the first refrigerant passage 751 and the second refrigerant in the second refrigerant passage 752. The cascade heat exchanger 75 is installed at a side of the water pipe 780 to allow both ends of the water passage 753 to communicate with bypass water pipe 789 with the water flow adjustment device 788 installed at a portion of the water pipe 780 from which the bypass water pipe 789 is branched.

A refrigerant flow through the hot water supply apparatus 8 will be described with reference to FIG. 8. First, when the hot water supply apparatus 7 associated with the heat pump performs an ordinary operation, a refrigerant flow therethrough is essentially the same as that of the embodiment shown in FIG. 1. Ordinary operation may include hot water supply, heating, and cooling operations. Also, during ordinary operation, a flow of the first refrigerant through the bypass pipe 796 is intercepted by the first hot water supply flow adjustment device 797, a flow of the second refrigerant through the auxiliary hot water supply pipe 790 is intercepted by the second hot water supply flow adjustment device 793, the third hot water supply flow adjustment device 794, and the fourth hot water supply flow adjustment device 795, and a flow of the bypass water pipe 789 is intercepted by the water flow adjustment device 788.

Referring to FIG. 9, when the hot water supply apparatus 7 associated with the heat pump performs a defrosting operation, a flow of the first refrigerant toward the hot water supply condenser 76 is intercepted by the first hot water supply flow adjustment device 797, and a flow of the refrigerant directly introduced from the second compressor 721 into the second flow switch device 725 is intercepted by the second hot water supply flow adjustment device 793. Also, a flow of the first refrigerant toward the hot water supply condenser 76 is intercepted by the third hot water supply flow adjustment device 794 and the fourth hot water supply flow adjustment device 795, and simultaneously, the hot water supply condenser 76 and the second refrigerant pipe 720 communicate with each other to bypass the second refrigerant into the hot water supply condenser 76. The water passing through the indoor heat exchanger 77, i.e., the heating device 74, is bypassed by the water flow adjustment device 788 to pass through the cascade heat exchanger 75 along the bypass water pipe 789.

Thus, the first refrigerant discharged from the first compressor 711 is directly introduced into the first flow switch 715, passes through the first flow switch 715, and is introduced into the outdoor heater exchanger 713. The first refrigerant is condensed during the defrosting operation while passing through the outdoor heat exchanger 713 and then expanded while passing through a first expander 714. The first refrigerant passing through the first expander 714 absorbs heat from the water while passing through the cascade heat exchanger 75, and is thus evaporated. The first refrigerant passing through the cascade heat exchanger 75 is introduced again into the first compressor 711 via the first flow switch 715.

The second refrigerant discharged from the second compressor 721 is introduced into the hot water supply condenser 76 through the first auxiliary hot water supply pipe 791. The second refrigerant is primarily condensed while passing through the hot water supply condenser 76, and is then introduced into the second flow switch 725 through the second auxiliary hot water supply pipe 792. The second refrigerant passing through the second flow switch 725 is secondarily condensed while passing through an indoor heat exchanger 77 and is expanded in the second expander 724. Thereafter, the second refrigerant absorbs heat from the water in the cascade heat exchanger 75, and is thus evaporated.

That is, the hot water supply operation is performed using the first refrigerant during ordinary operation, and the hot water supply is performed using the second refrigerant during the defrosting operation. In addition, the refrigerant flowing into the hot water supply condenser 76 is compressed by the first compressor 711 during ordinary operation, and the refrigerant flowing into the hot water supply condenser 76 is compressed by the second compressor 721 during the defrosting operation. Also, during the defrosting operation, the first refrigerant and the second refrigerant absorb heat from the water passing through the heating device 74 into the cascade heat exchanger 75, and thus are continuously evaporated.

Thus, in this embodiment, hot water supply and heating operations may be continuously performed during the defrosting operation.

The hot water supply apparatus 7 associated with the heat pump in accordance with the embodiment shown in FIGS. 8 and 9 may also include a pump 781, a water collection tank 782, an auxiliary heater 783, a water supply passage 731, a hot water storage device 732, an auxiliary heating source 733, a hot water discharge passage 734, branch pipes 741 and 742, and three way valves 743 and 744. These components are similar to corresponding components discussed above with respect to previous embodiment(s), and thus further detailed description will be omitted.

Hereinafter, a hot water supply apparatus associated with a heat pump according to another embodiment will be described in detail with reference to FIG. 10. This embodiment is different from the embodiment shown in FIG. 1 in that it may include injection of a vapor refrigerant. In this embodiment, description of parts that are the same as or similar to those of the embodiment shown in FIG. 1 will be taken from the description of the embodiment shown in FIG. 1.

Figure 10:
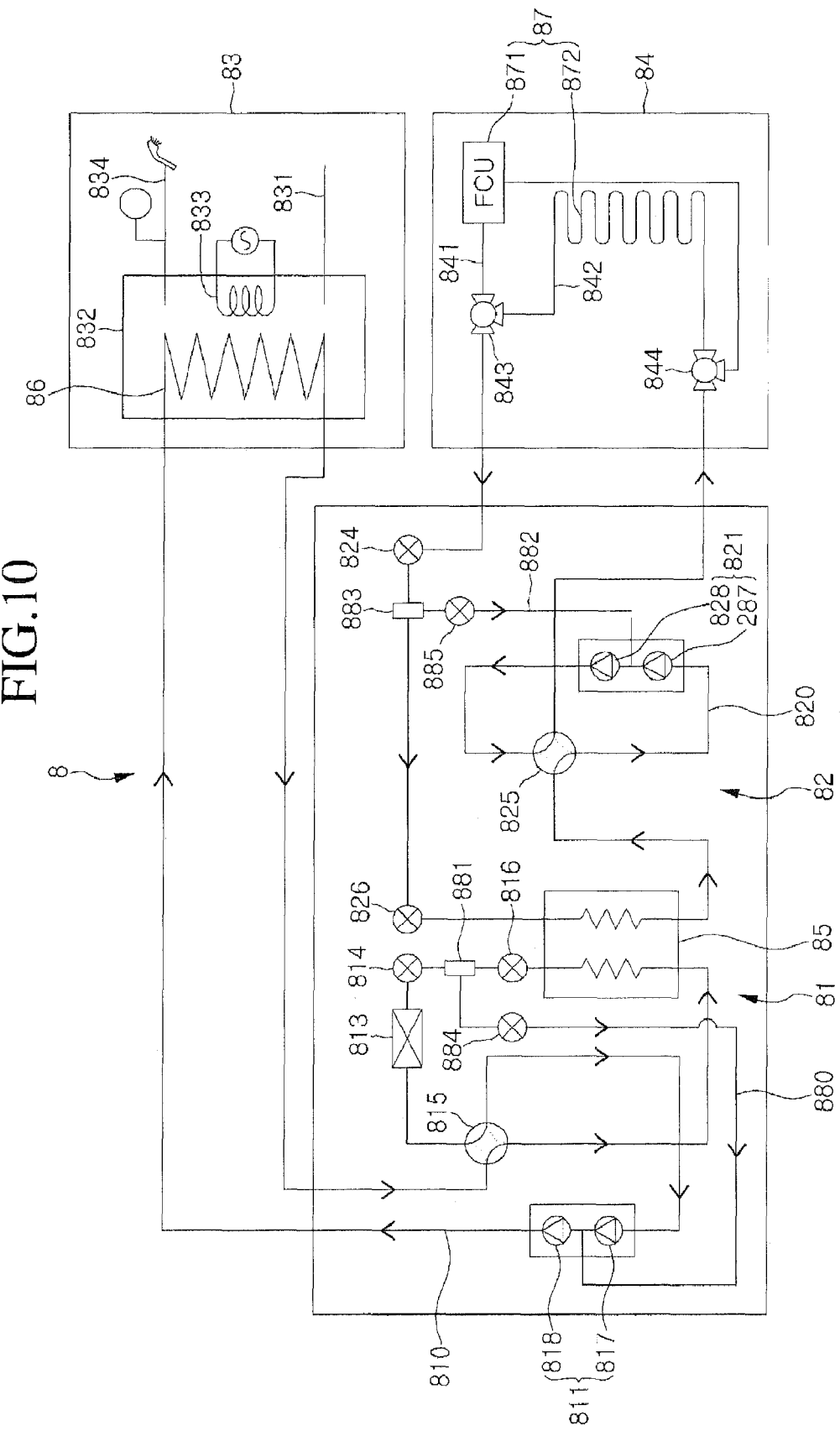
FIG. 10 is a schematic view of a hot water supply apparatus associated with a heat pump according to another embodiment as broadly described herein.

Referring to FIG. 10, in order to increase hot water supply and heating performance in a hot water supply apparatus 8 associated with a heat pump as embodied and broadly described herein, a vapor refrigerant of a refrigerant passing through each of condensers 85 and 87 of a first refrigerant circulation part 81 and a second refrigerant circulation part 82 may be respectively injected into compressors 811 and 821.

In detail, the first compressor 811 may include a first lower end compression part 817 in which a first refrigerant is compressed and a first intermediate compression part 818 in which the first refrigerant passing through the first lower end compression part 817 is compressed. The second compressor 821 includes a second lower end compression part 827 in which a second refrigerant is compressed and a second intermediate compression part 828 in which the second refrigerant passing through the second lower end compression part 827 is compressed. That is, the first compressor 811 and the second compressor 821 may each be a multi-stage compressor including a plurality of compression parts.

The first refrigerant circulation part 81 includes a first phase separator 881 separating the refrigerant flowing between an outdoor heat exchanger 813 and a cascade heat exchanger 85 (functioning as the condenser 85 above) in a first refrigerant cycle into a vapor refrigerant and a liquid refrigerant, a first injection pipe 880 for guiding the vapor refrigerant separated by the first phase separator 881 into the first intermediate compression part 818, and first and second expanders 814 and 816 provided at two opposite sides of the first phase separator 881 in the first refrigerant cycle.

The second refrigerant circulation part 82 includes a second phase separator 883 separating the refrigerant flowing between the cascade heat exchanger 85 and an indoor heat exchanger 87 (functioning as the condenser 87 above) of a heating device 84 in a second refrigerant cycle into a vapor refrigerant and a liquid refrigerant, a second injection pipe 882 for guiding the vapor refrigerant separated by the second phase separator 883 into the second intermediate compression part 828, and third and fourth expanders 824 and 826 provided at two opposite sides of the second phase separator 883 in the second refrigerant cycle.

A refrigerant flow in the hot water supply apparatus 8 according to the embodiment shown in FIG. 10 will be described. During a heating operation, the first refrigerant passing through the cascade heat exchanger 85 and flowing toward the outdoor heat exchanger 813 is separated into a vapor refrigerant and a liquid refrigerant by the first phase separator 881. The first refrigerant separated by the first phase separator 881 is introduced into the first intermediate compression part 818 along the first injection pipe 880. The first liquid refrigerant separated by the phase separator 881 passes through the outdoor heat exchanger 813 and is introduced into the first lower end compression part 817. The first refrigerant compressed by the first lower end compression part 817 is introduced into the first intermediate compression part 818 together with the first vapor refrigerant introduced through the first injection pipe 880.

The first refrigerant passing through the indoor heat exchanger 87 and flowing toward the cascade heat exchanger 85 is separated into a vapor refrigerant and a liquid refrigerant by the second phase separator 883. The second vapor refrigerant separated by the second phase separator 883 is introduced into the second intermediate compression part 828 along the second injection pipe 882. The second liquid refrigerant separated by the second phase separator 883 passes through the cascade heat exchanger 85 and is introduced into the second lower end compression part 827. The second refrigerant compressed by the second lower end compression part 827 is introduced into the second intermediate compression part 828 together with the second vapor refrigerant introduced through the second injection pipe 882.

A pressure within the first phase separator 881 may be referred to as a first middle pressure, and a pressure within the second phase separator 883 may be referred to as a second middle pressure. The first middle pressure may be adjusted by adjusting an open degree of the first expander 814, and the second middle pressure may be adjusted by adjusting an open degree of the second expander 816. Since an opening degree of the first and second expanders 814 and 816 are adjusted to allow the first and second middle pressures to reach a preset middle pressure, overall efficiency may be improved by reducing work consumed in the compressors 811 and 821.

Also, injection of the first refrigerant increases a flow rate of the refrigerant passing through the cascade heat exchanger 85 and injection of the second refrigerant increases a flow rate of the refrigerant passing through the indoor heat exchanger 87, thus improving heating performance may be further improved.

A first injection valve 884 for selectively intercepting a flow of the first refrigerant through the first injection pipe 880 is installed on the first injection pipe 880, and a second injection valve 885 for selectively intercepting a flow of the second refrigerant through the second injection pipe 882 is installed on the second injection pipe 882. Thus, the first refrigerant and the second refrigerant may be selectively injected based on changes in the hot water supply load and heating load.

The hot water supply apparatus 8 associated with the heat pump in accordance with the embodiment shown in FIG. 10 may also include a first refrigerant pipe 810, a first flow adjustment switch 815, a second refrigerant pipe 820, a second flow adjustment switch 825, a hot water supply device 83 including a first hot water supply heat exchanger 86, a water supply passage 831, a hot water storage device 832, an auxiliary heating source 833 and a hot water discharge passage 834, an air conditioning heat exchanger 871, a floor heat exchanger 872, branch pipes 841 and 842, and three way valves 843 and 844. These components are similar to corresponding components discussed above with respect to previous embodiment(s), and thus further detailed description will be omitted.

Hereinafter, a hot water supply apparatus associated with a heat pump according to another embodiment will be described in detail with reference to FIG. 11. This embodiment is different from the embodiment shown in FIG. 10 in that a heating operation is performed using water that has undergone heat exchange with a second refrigerant. In this embodiment, description of parts that are the same as or similar to those of the embodiment shown in FIG. 10 will be taken from the description of the embodiment shown in FIG. 10.

Figure 11:
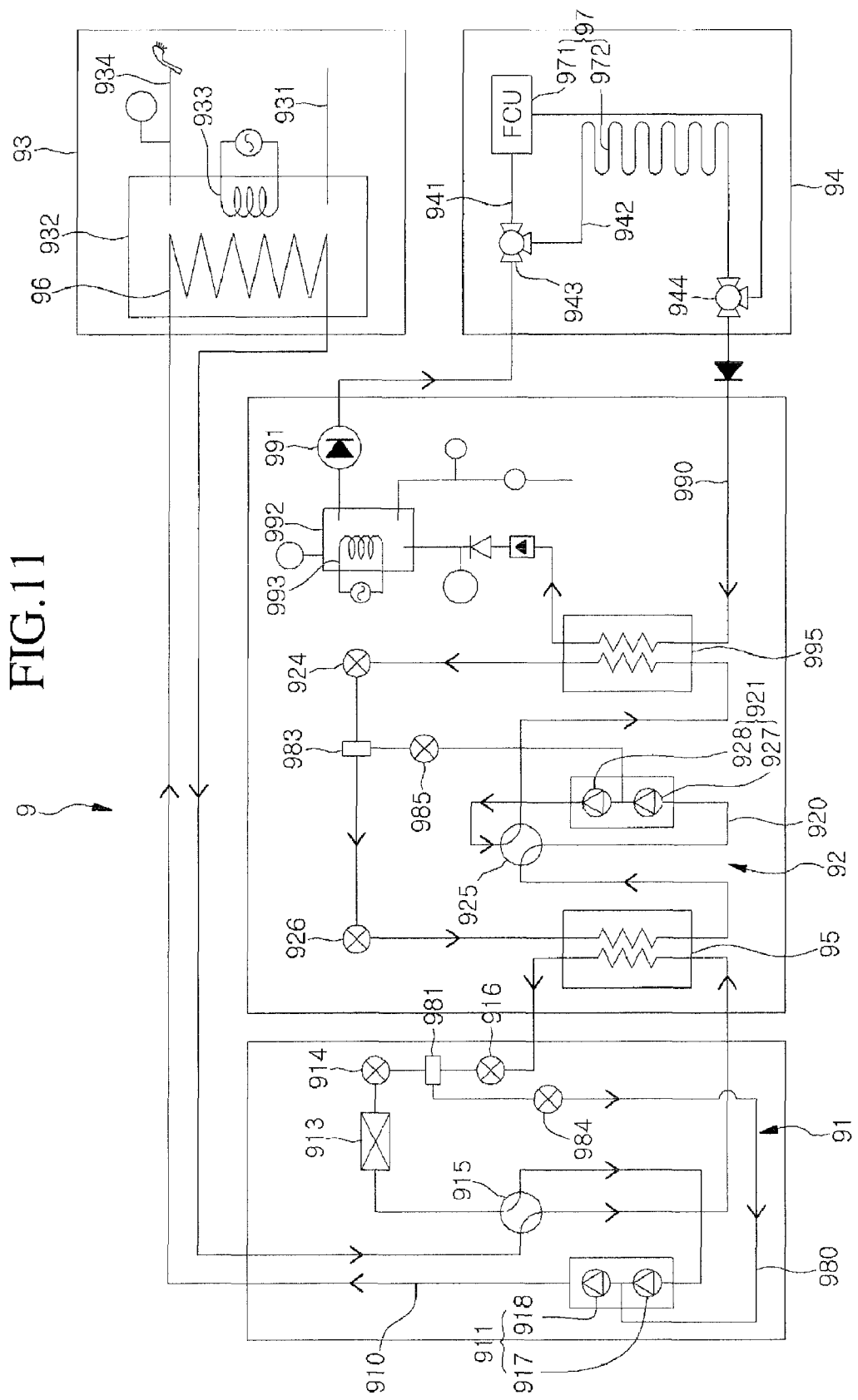
FIG. 11 is a schematic view of a hot water supply apparatus associated with a heat pump according to another embodiment as broadly described herein.

As shown in FIG. 11, a hot water supply apparatus 9 associated with a heat pump may include a water-refrigerant heat exchanger 995 exchanging heat between a high-temperature second refrigerant discharged from a second compressor 921 and water, a water pipe 990 in which the water heat-exchanged with the second refrigerant in the water refrigerant heat exchanger 995 is circulated, and a pump 991 for forcibly circulating the water within the water pipe 990. An indoor heat exchanger 97 may be disposed at a side of the water pipe 990 to heat the water flowing into the indoor heat exchanger 97. The indoor heat exchanger 97 may include an air-conditioning heat exchanger 971 exchanging heat between indoor air and the water and a bottom, or floor, heat exchanger 972 exchanging heat between a bottom surface of an indoor space, such as, for example, a floor, and the water. The water flowing into the air-conditioning heat exchanger 971 may heat the indoor air, and the water flowing into the floor heat exchanger 972 may heat the floor.

A water flow within the water pipe 990 will be described. In the water-refrigerant heat exchanger 995, the water absorbing heat from the second refrigerant flows along the water pipe 990. The heat of the water is transferred to the indoor air while passing through the indoor heat exchanger 97, and the water is then introduced again into the water-refrigerant heat exchanger 995 along the water pipe 990.

In this situation, the water-refrigerant heat exchanger 995 corresponds to a heating condenser 995 in which the second refrigerant heats the water for heating and is condensed.

A flow switch 986 for detecting a water flow, an expansion tank 987 for buffering a water volume change, and a water collection tank 992 including an auxiliary heater 993 therein may be further disposed on the water pipe 990. An air vent 988 for discharging overheated air is provided at an upper side of the water collection tank 992, a pressure gauge 989 for displaying a pressure within the water collection tank 992, and a relief valve for adjusting the pressure within the water collection tank 992 when the pressure within the water collection tank 992 is excessively high may be all be provided at the water collection tank 992. The water refrigerant heat exchanger 995, the pump 991, the flow switch 986, the expansion tank 987, and the water collection tank 992 may all be provided in a heat pump including first and second refrigerant circulation parts 91 and 92.

A refrigerant flow in the hot water supply apparatus 9 associated with the heat pump as shown in FIG. 11 is similar to that of the embodiment shown in FIG. 10.

In this embodiment, since the heat pump and the indoor heat exchanger 97 of the heating device 94 are connected to the water pipe 990, rather than to a refrigerant pipe, an amount of the second refrigerant flowing into the second refrigerant circulation part 92 may be reduced. Thus, an amount of refrigerant required for performing the hot water supply operation may be reduced.

Also, since the water pipe 990 may be easily installed and replaced when compared to the refrigerant pipe, the hot water supply device 9 associated with the heat pump may be easily installed and replaced.

The hot water supply apparatus 9 associated with the heat pump in accordance with the embodiment shown in FIG. 11 may also include a first refrigerant pipe 910, a first compressor 911 including compression parts 917 and 918, an outdoor heat exchanger 913, a first expander 914, a first flow adjustment switch 915, a second expander 916, a first phase separator 981, a first injection valve 984, a cascade heat exchanger 95, a second refrigerant pipe 920, a second flow adjustment switch 925, third and fourth expanders 924 and 926, a second compressor 921 including compression parts 927 and 928, a second phase separator 983, a second injection valve 985, a hot water supply device 93 including a first hot water supply heat exchanger 96, a water supply passage 931, a hot water storage device 932, an auxiliary heating source 933 and a hot water discharge passage 934, branch pipes 941 and 942, and three way valves 943 and 944. These components are similar to corresponding components discussed above with respect to previous embodiment(s), and thus further detailed description will be omitted.

A hot water supply apparatus associated with a heat pump is provided which may improve hot water supply performance and heating performance at the same time. A hot water supply apparatus associated with a heat pump as embodied and broadly described herein may include a first refrigerant circulation part in which a first refrigerant cycle using a first refrigerant is performed, the first refrigerant circulation part including a first compressor compressing the first refrigerant, a hot water supply heat exchanger performing a hot water supply using the first refrigerant, and a cascade heat exchanger in which the first refrigerant and a second refrigerant are heat-exchanged with each other; and a second refrigerant circulation part in which a second refrigerant cycle using the second refrigerant heat-exchanged with the first refrigerant is performed, the second refrigerant circulation part including a second compressor compressing the second refrigerant and an indoor heat exchanger through which indoor heating or cooling is performed using the second refrigerant, wherein, when a heating operation is performed, the hot water supply heat exchanger is used as a primary condenser for primarily condensing the first refrigerant having a high temperature and discharged from the first compressor to improve hot water supply performance, and the cascade heat exchanger is used as a secondary condenser for secondarily condensing the first refrigerant passing through the hot water supply heat exchanger to improve heating performance. Therefore, according to the present invention, the hot water supply performance and the heating performance may be improved at the same time.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A hot water supply apparatus associated with a heat pump, comprising:
    a first refrigerant circuit that circulates a first refrigerant, comprising a first compressor that compresses the first refrigerant, a hot water supply heat exchanger that is disposed in a water supply storage device to store water being heated, and a first refrigerant pipe connecting the first compressor and the hot water supply heat exchanger to guide a flow of the first refrigerant and a first flow switch part installed at the first refrigerant pipe;
    a second refrigerant circuit that circulates a second refrigerant, comprising a second compressor that compresses the second refrigerant, a water-refrigerant heat exchanger that performs heat exchange between the second refrigerant discharged from the second compressor and water and and a second refrigerant pipe connecting the second compressor and the water-refrigerant heat exchanger to guide a flow of the second refrigerant;
    a cascade heat exchanger operably coupled to each of the first and second refrigerant circuits so as to perform heat exchange between the first and second refrigerants; and
    an indoor heat exchanger that receives the water from the water-refrigerant heat exchanger so as to perform at least one of the heating or cooling operation,
    wherein the first refrigerant pipe comprises:
        a first pipe extended from an outlet of the compressor to the hot water supply heat exchanger, the first pipe to allow refrigerant discharged from the first compressor to flow into the hot water supply heat exchanger,
        a second pipe extended from the hot water supply heat exchanger to the first flow switch part, the second pipe to allow refrigerant passing through the hot water supply heat exchanger to flow into the first flow switch part, and
        a bypass pipe extended from the a first spot of the first pipe to a first spot of the second pipe, the bypass pipe to allow refrigerant discharged from the first compressor to flow into the first flow switch part,
        wherein the hot water supply apparatus further comprises a first hot water supply flow adjustment part installed at the first spot of the first pipe to allow refrigerant discharged from the first compressor:
            to flow into the hot water supply heat exchanger via the first pipe in a first operation mode, and
            to flow into the first flow switch part via the bypass pipe in a second operation mode.

2. The hot water supply apparatus of claim 1, further comprising:
    a water pipe in which the water that has undergone heat exchange with the second refrigerant in the water-refrigerant heat exchanger is circulated; and
    a pump for forcibly circulating the water within the water pipe.

3. The hot water supply apparatus of claim 1, wherein the indoor heat exchanger comprises an air-conditioning heat exchanger for exchanging heat between indoor air and the water, or
    a floor heat exchanger for exchanging heat between a bottom surface of the indoor space and the water.

4. The hot water supply apparatus of claim 1, wherein the water-refrigerant heat exchanger is a heating condenser in which the second refrigerant heats the water for heating and is condensed.

5. The hot water supply apparatus of claim 1, further comprising:
a second flow switch that selectively switches a flow direction of the second refrigerant passing through the second compressor toward one of the water-refrigerant heat exchanger or the cascade heat exchanger.

6. The hot water supply apparatus of claim 5, further comprising an auxiliary hot water supply pipe that connects the first refrigerant circuit to the second refrigerant circuit.

7. The hot water supply apparatus of claim 6, wherein the auxiliary hot water supply pipe comprises:
a first auxiliary hot water supply pipe extended from a second spot of the first pipe to an outlet of the second compressor.

8. The hot water supply apparatus of claim 7, wherein the auxiliary hot water supply pipe comprises:
a second auxiliary hot water supply pipe extended from a second spot of the second pipe to the second flow switch.

9. The hot water supply apparatus of claim 7, further comprising:
a second hot water supply flow adjustment device installed at the first auxiliary hot water supply pipe to adjust an amount of the second refrigerant discharged from the second compressor and introduced into the hot water supply heat exchanger through the first auxiliary hot water supply pipe and an amount of the second refrigerant directly introduced into the second flow switch.

10. The hot water supply apparatus of claim 8, further comprising:
a third hot water supply flow adjustment device installed at the second spot of the first pipe; and
a fourth hot water supply flow adjustment device installed at the second spot of the second pipe.

11. The hot water supply apparatus of claim 1, further comprising:
a bypass water pipe that bypasses the water passing through the indoor heat exchanger into the cascade heat exchanger during the defrosting operation.

12. The hot water supply apparatus of claim 11, wherein the bypass water pipe is branched at a first portion of a water pipe between an indoor heat exchanger and the water-refrigerant heat exchanger and rejoins at the second portion of the water pipe corresponding to a discharge side of the water refrigerant heat exchanger.

13. The hot water supply apparatus of claim 1, further comprising an outdoor heat exchanger in which the first refrigerant is heat-exchanged with an outdoor air,
wherein the first flow switch selectively switches a flow direction of the first refrigerant passing through the hot water supply heat exchanger into the cascade heat exchanger or the outdoor heat exchanger.

* * * * *